(12) United States Patent
Watanabe

(10) Patent No.: US 6,765,703 B1
(45) Date of Patent: Jul. 20, 2004

(54) METHOD AND APPARATUS FOR SENSING IMAGE

(75) Inventor: Kouichi Watanabe, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 766 days.

(21) Appl. No.: 09/670,621

(22) Filed: Sep. 27, 2000

(51) Int. Cl.[7] .............................. H04N 1/46; H03M 1/12
(52) U.S. Cl. ...................... 358/514; 358/445; 358/483; 341/155
(58) Field of Search ................................. 358/514, 513, 358/512, 505, 506, 500, 515, 483, 445, 482; 341/155, 156, 141; 250/208.1, 234–236; 348/272, 273

(56) References Cited

U.S. PATENT DOCUMENTS

| | | | | |
|---|---|---|---|---|
| 4,739,397 A | * | 4/1988 | Hayashi | 358/514 |
| 5,521,640 A | * | 5/1996 | Prater | 348/273 |
| 5,557,426 A | * | 9/1996 | Sakata | 358/448 |
| 5,773,814 A | * | 6/1998 | Phillips et al. | 250/208.1 |
| 6,046,829 A | * | 4/2000 | Noda | 358/513 |
| 6,593,968 B1 | * | 7/2003 | Ichikawa | 358/514 |

FOREIGN PATENT DOCUMENTS

JP          11-275371          10/1999

* cited by examiner

*Primary Examiner*—Cheukfan Lee
(74) *Attorney, Agent, or Firm*—Foley & Lardner

(57) ABSTRACT

This invention uses a 4-line color CCD sensor including four line sensors Y, R, G, and B. In a low-speed color read mode, outputs from these sensors are processed by A/D converters and subsequent processing units provided in one-to-one correspondence with the sensors. In a high-speed monochromatic read mode, an output from the Y sensor is divisionally processed by using A/D converters and subsequent processing units provided in one-to-one correspondence not only with the Y sensor but also with the other R, G, and B sensors. This provides an image reading apparatus usable in both the high-speed monochromatic mode and the low-speed color mode and capable of achieving high speed, high accuracy, and low cost.

14 Claims, 19 Drawing Sheets

METHOD AND APPARATUS FOR SENSING IMAGE

BACKGROUND OF THE INVENTION

One conventional image reading apparatus is disclosed in Japanese Patent Laid-Open No. 11-275371, but this apparatus has the following problems.

First, the apparatus has only three image sensors for R, G, and B and does not include any image sensor dedicated to monochromatic images. To process monochromatic images, therefore, a monochromatic luminance signal (Y) is generated by using the image sensors for R, G, and B. Hence, the image quality lowers owing to, e.g., positional differences between the three image sensors and differences between their spectral sensitivity characteristics.

Second, when this monochromatic luminance signal (Y) is generated directly from the outputs of the image sensors for R, G, and B, the image quality lowers owing to differences between the original reading positions of these image sensors with respect to a pixel from which a Y image is to be generated. Also, when a CCD line sensor which is generally extensively used is used as a color CCD sensor, the R, G, and B sensors are arranged in lines with certain finite intervals between them. Therefore, the image quality significantly lowers if the monochromatic luminance signal (Y) is generated directly from the outputs of these color sensors without correcting the reading position differences between the lines. Accordingly, CCD line sensors that are commonly widely used cannot be used in practice in a system which generates the monochromatic luminance signal (Y) directly from the outputs of the R, G, and B image sensors.

Third, a filter is attached to each of the R, G, and B image sensors so that each image sensor has high sensitivity to a specific wavelength when the monochromatic luminance signal (Y) is generated from these sensors. This filter reduces the quantity of light supplied to the image sensor. When the reading rate is raised, therefore, the quantity of light supplied to each image sensor further reduces, leading to a lowering of the reading accuracy.

SUMMARY OF THE INVENTION

It is an object of the present invention to provide an image reading method and apparatus capable of rapidly reading monochromatic images, realizing image quality on a desired level, and obtaining high-quality color images.

An image reading apparatus of the present invention comprises a line sensor unit including a monochromatic sensor for outputting a one-line signal by dividing the signal into a plurality of signals, and a plurality of color sensors, a mode setting circuit for setting one of a monochromatic mode and a color mode, a monochromatic analog-to-digital converter which corresponds to the monochromatic sensor and receives signals and performs analog-to-digital conversion for the received signals, a plurality of color analog-to-digital converters which correspond to the plurality of color sensors and receive signals and perform analog-to-digital conversion for the received signals, and a selector for distributing, when the monochromatic mode is set in the mode setting circuit, the plurality of output signals from the monochromatic sensor to the monochromatic analog-to-digital converter and the color analog-to-digital converters to cause the monochromatic and color analog-to-digital converters to perform analog-to-digital conversion for the signals.

When the color mode is set in the mode setting circuit, the selector can supply output signals from the color sensors to corresponding ones of the color analog-to-digital converters to cause the color analog-to-digital converters to perform analog-to-digital conversion for the signals.

The apparatus can further comprise line delaying/rearranging units which correspond to the monochromatic analog-to-digital converter and the color analog-to-digital converters, and receive output digital signals, delay the signals in units of lines, and output the digital signals by rearranging the signals, wherein when the monochromatic mode is set in the mode setting circuit, the line delaying/rearranging units can receive the digital signals, which are divisionally output from the monochromatic sensor and subjected to analog-to-digital conversion by the monochromatic analog-to-digital converter and the color analog-to-digital converters, and output the digital signals by rearranging the signals.

When the color mode is set in the mode setting circuit, the line delaying/rearranging units can receive the digital signals, which are output from the color sensors and subjected to analog-to-digital conversion by the color analog-to-digital converters, and output the digital signals by rearranging the signals.

The number of divided outputs from the monochromatic sensor can be larger than the number of outputs from the color sensors.

The monochromatic sensor can divide the signal by a number four times the number of the color sensors and output the divided signals.

The monochromatic sensor can be placed closer to one end face of the sensor unit than the color sensors.

The sensor unit can be set such that when an original is read in a forward direction, the monochromatic sensor reads a position on the original, which leads positions read by the color sensors.

The apparatus can further comprise a read direction setting unit for setting an original read direction to one of a forward direction and a reverse direction, wherein in accordance with one of the forward direction and the reverse direction set in the read direction setting unit, the line delaying/rearranging units can switch a line delaying and pixel rearranging process in the forward direction and a line delaying and pixel rearranging process in the reverse direction.

An image reading method of the present invention performs image processing by using a line sensor unit including a monochromatic sensor for outputting a one-line signal by dividing the signal into a plurality of signals, and a plurality of color sensors, a monochromatic analog-to-digital converter which corresponds to the monochromatic sensor and receives signals and performs analog-to-digital conversion for the received signals, and a plurality of color analog-to-digital converters which correspond to the plurality of color sensors and receive signals and perform analog-to-digital conversion for the received signals, wherein when a monochromatic mode rather than a color mode is set, the plurality of output signals from the monochromatic sensor are distributed to the monochromatic analog-to-digital converter and the color analog-to-digital converters to cause the monochromatic and color analog-to-digital converters to perform analog-to-digital conversion for the signals.

When the color mode is set, output signals from the color sensors can also be supplied to corresponding ones of the color analog-to-digital converters to cause the color analog-to-digital converters to perform analog-to-digital conversion for the signals.

Line delaying/rearranging units corresponding to the monochromatic analog-to-digital converter and the color analog-to-digital converters can be used to receive output digital signals, delay the signals in units of lines, and output the digital signals by rearranging the signals, and when the monochromatic mode is set, only the divided output signals from the monochromatic sensor can be used to rearrange digital signals subjected to analog-to-digital conversion by the monochromatic analog-to-digital converter and the color analog-to-digital converters.

When the color mode is set, the digital signals, which are output from the color sensors and subjected to analog-to-digital conversion by the color analog-to-digital converters, can be rearranged by using the line delaying/rearranging units.

When an original read direction is set to one of a forward direction and a reverse direction, in accordance with one of the forward direction and the reverse direction set as the read direction, the line delaying/rearranging units can switch a line delaying and pixel rearranging process in the forward direction and a line delaying and pixel rearranging process in the reverse direction.

DESCRIPTION OF THE PREFERRED EMBODIMENT

An embodiment of the present invention will be described below with reference to the accompanying drawings.

Figure 1:
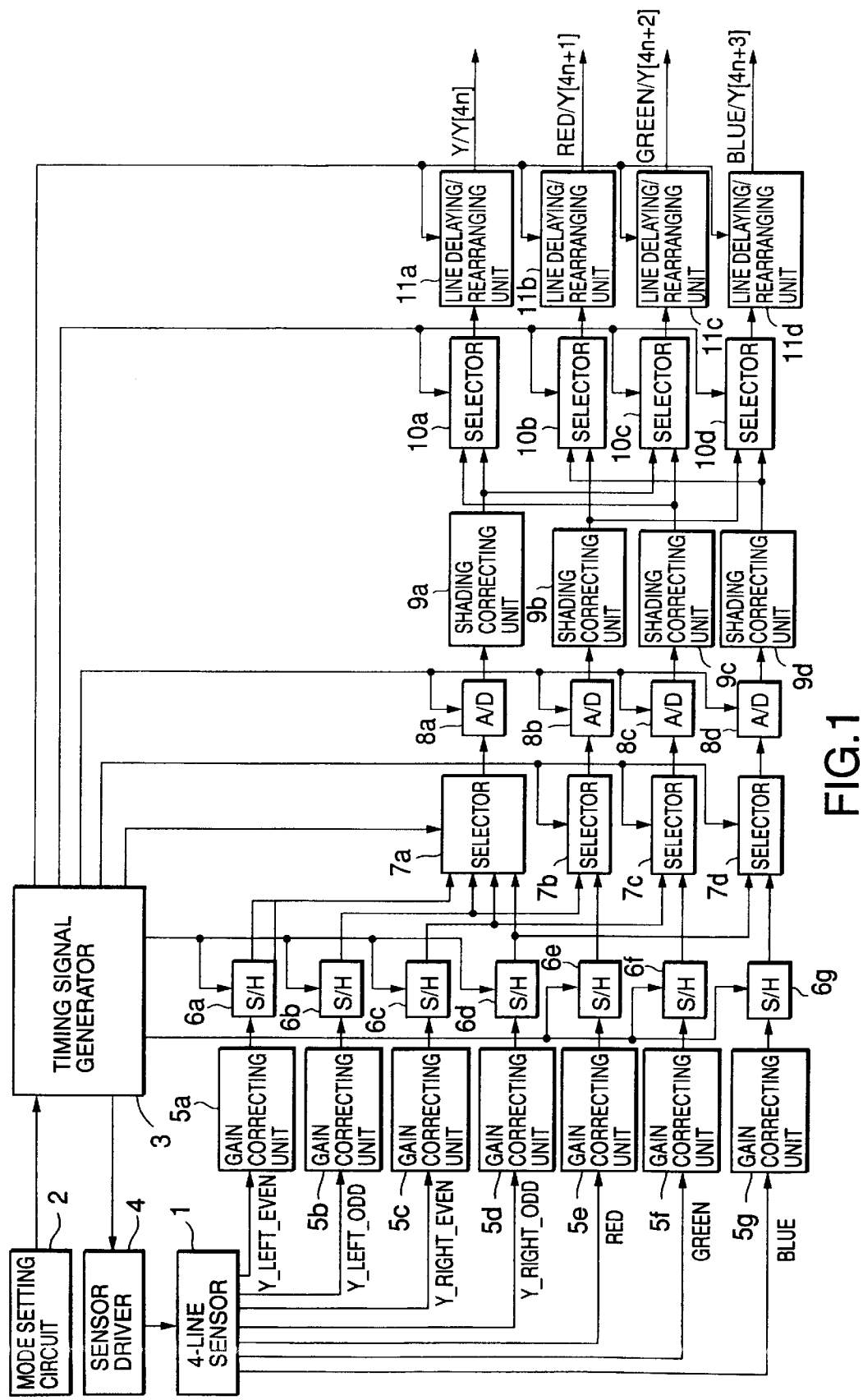
FIG. 1 is a block diagram showing the overall arrangement of an image reading apparatus according to one embodiment of the present invention.

FIG. 1 shows an outline of the arrangement of an image reading apparatus according to one embodiment of the present invention. This apparatus includes a 4-line sensor 1, a mode setting circuit 2, a timing signal generator 3, a sensor driver 4, gain correcting units 5a to 5g, sample-and-hold circuits 6a to 6g, selectors 7a to 7d, analog-to-digital (to be referred to as A/D hereinafter) converters 8a to 8d, shading correcting units 9a to 9d, selectors 10a to 10d, and line delaying/rearranging units 11a to 11d.

As will be described later, the 4-line sensor 1 includes four line sensors: color sensors for R (Red), G (Green), and B (Blue), and a Y sensor dedicated to monochromatic images.

The mode setting circuit 2 sets a selected mode and notifies the timing signal generator 3 of the set mode. The apparatus of this embodiment has two modes: the first one is a high-speed monochromatic mode in which images are processed at high speed by using only the output from the Y sensor of the four line sensors; and the second one is a low-speed color mode in which the outputs from all of the Y, R, G, and B sensors, or from the R, G, and B sensors except the Y sensor, are processed at the same speed.

In accordance with the set mode, the timing signal generator 3 generates various timing control signals and outputs the signals to the sensor driver 4, the sample-and-hold circuits 6a to 6g, the selectors 7a to 7d, the A/D converters 8a to 8d, the selectors 10a to 10d, and the line delaying/rearranging units 11a to 11d, thereby controlling the operation timings of these components.

When given an output timing pulse from the timing signal generator 3, the sensor driver 4 drives the 4-line sensor 1.

The gain correcting units 5a to 5g are supplied with output image signals from the 4-line sensor 1, i.e., a Y_LEFT_EVEN (black-and-white, left even-numbered pixel) signal, Y_LEFT_ODD (black-and-white, left odd-numbered pixel) signal, Y_RIGHT_EVEN (black-and-white, right even-numbered pixel) signal, Y_RIGHT_ODD (black-and-white, right odd-numbered pixel) signal, and R, G, and B signals, and correct the levels of these output signals from the individual sensors.

The sample-and-hold circuits 6a to 6g are supplied with the signals whose levels are corrected by the gain correcting units 5a to 5g and hold the signal levels in accordance with the output timing control signal from the timing signal generator 3. This prevents changes in the signal levels during A/D conversion.

The selectors 7a to 7d are given those output signals from the individual sensors, the signal levels of which are held by the sample-and-hold circuits 6a to 6g, switch the outputs in accordance with the set mode, and supply the outputs to the A/D converters 8a to 8d. In the high-speed monochromatic mode, four divided signals output from the Y sensor are supplied to the four A/D converters 8a to 8d. In the low-speed color mode, the outputs from the four, Y, R, G, and B sensors are supplied to the A/D converters 8a to 8d, respectively.

In accordance with the output timing control signal from the timing signal generator 3, the A/D converters 8a to 8d convert the analog signals supplied by the selectors 7a to 7d into, e.g., 10-bit digital signals. In this embodiment, the maximum conversion rate of each of the A/D converters 8a to 8d is, e.g., 20 Msps (20,000,000 samples/sec).

The shading correcting units 9a to 9d are supplied with the four divided output signals from the Y sensor (high-speed monochromatic mode) or the output signals from the four, Y, R, G, and B sensors (low-speed color mode), which are converted into digital signals by the A/C converters 8a to 8d.

These shading correcting units 9a to 9d perform shading correction in units of pixels for those output signals from the individual sensors, which are supplied from the A/D converters 8a to 8d.

The selectors 10a to 10d are supplied with the image data corrected by the shading correcting units 9a to 9d and switch the outputs in accordance with the mode. That is, in the high-speed monochromatic mode, the output image data from the Y sensor is distributed to the four line delaying/rearranging units 11a to 11d. In the low-speed color mode, the image data from the Y, R, G, and B sensors are supplied to the four line delaying/rearranging units 11a, 11b, 11c, and 11d, respectively.

The line delaying/rearranging units 11a to 11d correct the image data given by the selectors 10a to 10d as follows. That is, in the high-speed monochromatic mode, the four divided output signals from the Y sensor are corrected such that pixels are rearranged in the original order. In the low-speed color mode, the differences between the reading line positions of the four sensors are time-wise corrected to rearrange pixels in the original order.

The configuration and operation of each component of this embodiment having the above arrangement will be described in detail below.

Figure 2:
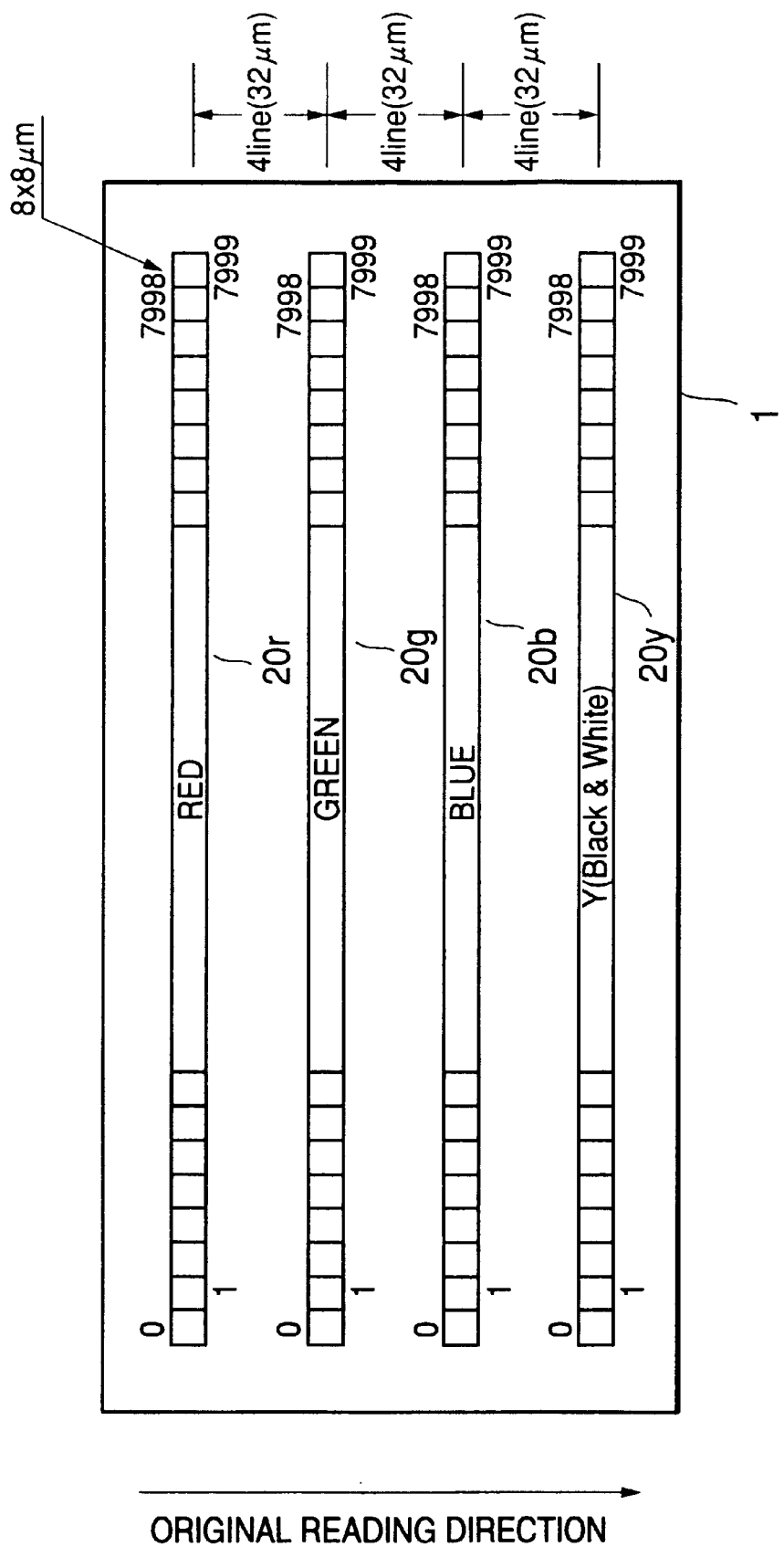
FIG. 2 is a view showing the arrangement of a 4-line color CCD sensor in the image reading apparatus.

FIG. 2 shows the array of an R sensor 20r, a G sensor 20g, a B sensor 20b, and a Y sensor 20y in the 4-line sensor 1.

The size of one pixel of each of these sensors 20r, 20g, 20b, and 20y is, e.g., 8×8 µm. The number of pixels of one line is, e.g., 8,000. The pitch between the line sensors is, e.g., 32 µm, which equals four lines as the number of pixels of these sensors.

When an original image is read at onefold magnification with this arrangement, the line sensors read portions separated by four lines from each other on the original image. To obtain image information of the same line on an original image, therefore, the differences between lines must be corrected on data.

Assume that, as indicated by an arrow in FIG. 2, the same line on an original image is read in the order of the Y sensor 20y, the B sensor 20b, the G sensor 20g, and the R sensor 20r. To obtain image data of the same line as an R image currently being read by the R sensor 20r, it is necessary to delay G, B, and Y images read by the G sensor 20g, the B sensor 20b, and the Y sensor 20y by 4, 8, and 12 lines, respectively.

To obtain an image enlarged by 400% by reducing the moving rate of the reading position to ¼, G, B, and Y images must be delayed 16, 32, and 48 lines, respectively. To obtain an image reduced by 50% by doubling the moving rate, G, B, and Y images need to be delayed 2, 4, and 6 lines, respectively.

Figure 3:
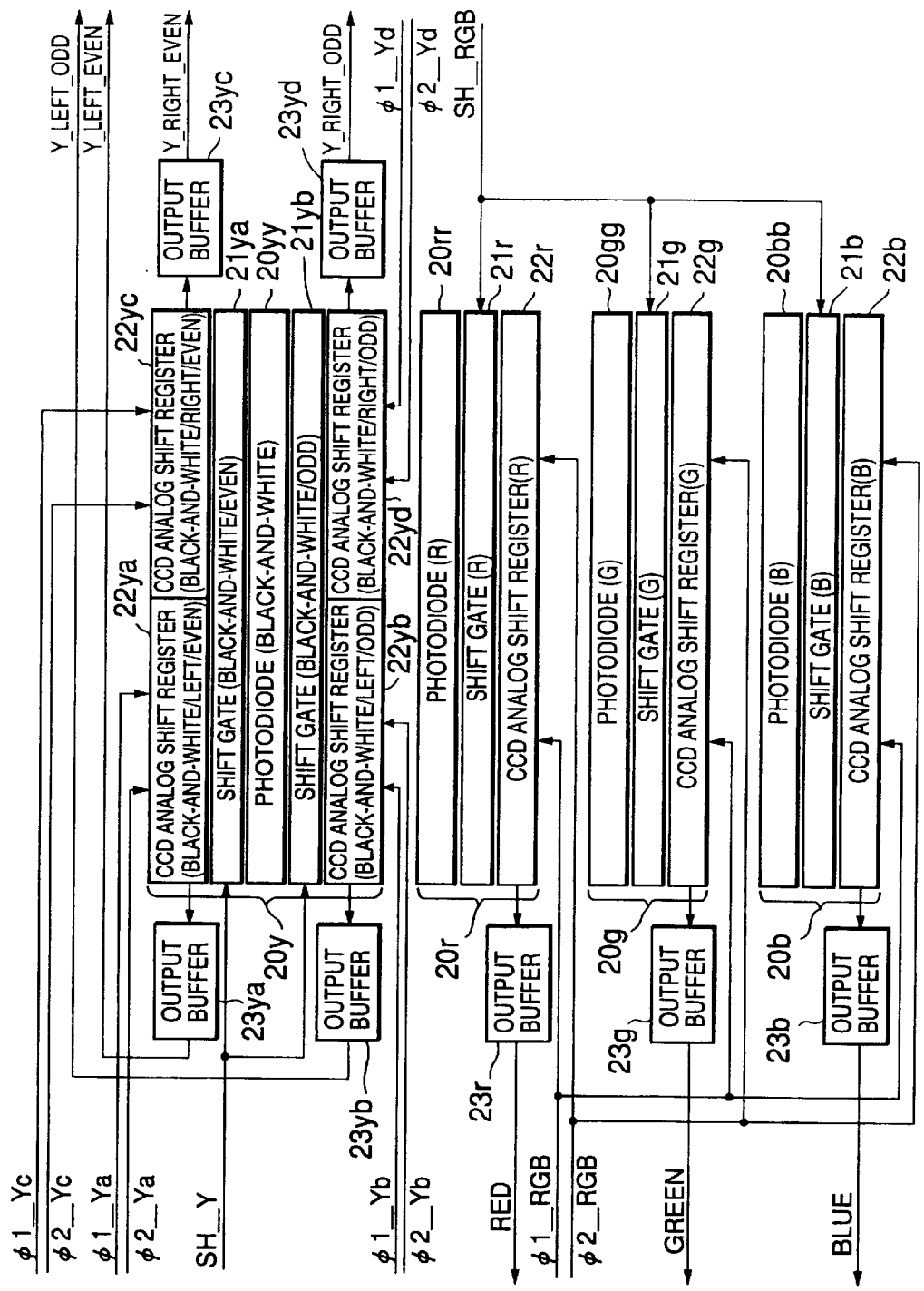
FIG. 3 is a block diagram showing the configuration of image signal transmission paths of the 4-line color CCD sensor.

FIG. 3 shows transmission paths of image signals in the 4-line sensor 1.

The three, R, G, and B sensors 20r, 20g, and 20b constituting the color line sensor include photodiodes 20rr, 20gg, and 20bb for photoelectrically converting an original image, shift gates 21r, 21g, and 21b for transferring the photoelectrically converted electric charges to CCD analog shift registers 22r, 22g, and 22b each of which transfers pixels of the supplied one-line electric charge one by one, and output buffers 23r, 23g, and 23b each for outputting the electric charge, transferred pixel by pixel, as a voltage signal.

The operations of charge transfer from the photodiodes 20rr, 20gg, and 20bb to the CCD analog shift registers 22r, 22g, and 22b are performed in accordance with timings at which a shift gate signal SH_RGB is applied to the shift gates 21r, 21g, and 21b, respectively. In the CCD analog shift registers 22r, 22g, and 22b, pixels are transferred one by one in accordance with the timings of transfer clocks Φ1_RGB and Φ2_RGB (Φ2_RGB is a signal having a phase opposite to that of Φ1_RGB).

The Y sensor 20y basically has the same configuration as the color sensors 20r, 20g, and 20b. However, to read out an image signal of one line within a time ¼ that of the color sensors without changing each individual charge transfer rate in a CCD analog shift register, this CCD analog shift register is divided into four registers: a right even-numbered register 22yc, a left even-numbered register 22ya, a right odd-numbered register 22yd, and a left odd-numbered register 22yb of a photodiode 20yy. A fourfold transfer rate is realized by transferring electric charges by these CCD analog shift registers 22ya, 22yb, 22yc, and 22yd at the same time.

The electric charges transferred pixel by pixel by these CCD analog shift registers 22ya, 22yb, 22yc, 22yd are converted into voltage signals by output buffers 23ya, 23yb, 23yc, and 23yd, respectively, and output.

The charge transfer from the photodiode 20yy to the CCD analog shift registers 22ya, 22yb, 22yc, and 22yd in the Y sensor 20y is performed in accordance with the timing of a shift gate signal SH_Y common to the lines.

Charge transfer clocks Φ1_Ya and Φ2_Ya, Φ1_Yb and Φ2_Yb, Φ1_Yc and Φ2_Yc, and Φ1_Yd and Φ2_Yd (Φ2 is a signal having a phase opposite to that of Φ1) supplied to the CCD analog shift registers 22ya, 22yb, 22yc, and 22yd, respectively, can be independently supplied to these CCD analog shift registers. Therefore, the transfer timings of the CCD analog shift registers 22ya, 22yb, 22yc, and 22yd can be separately controlled.

Figure 5:
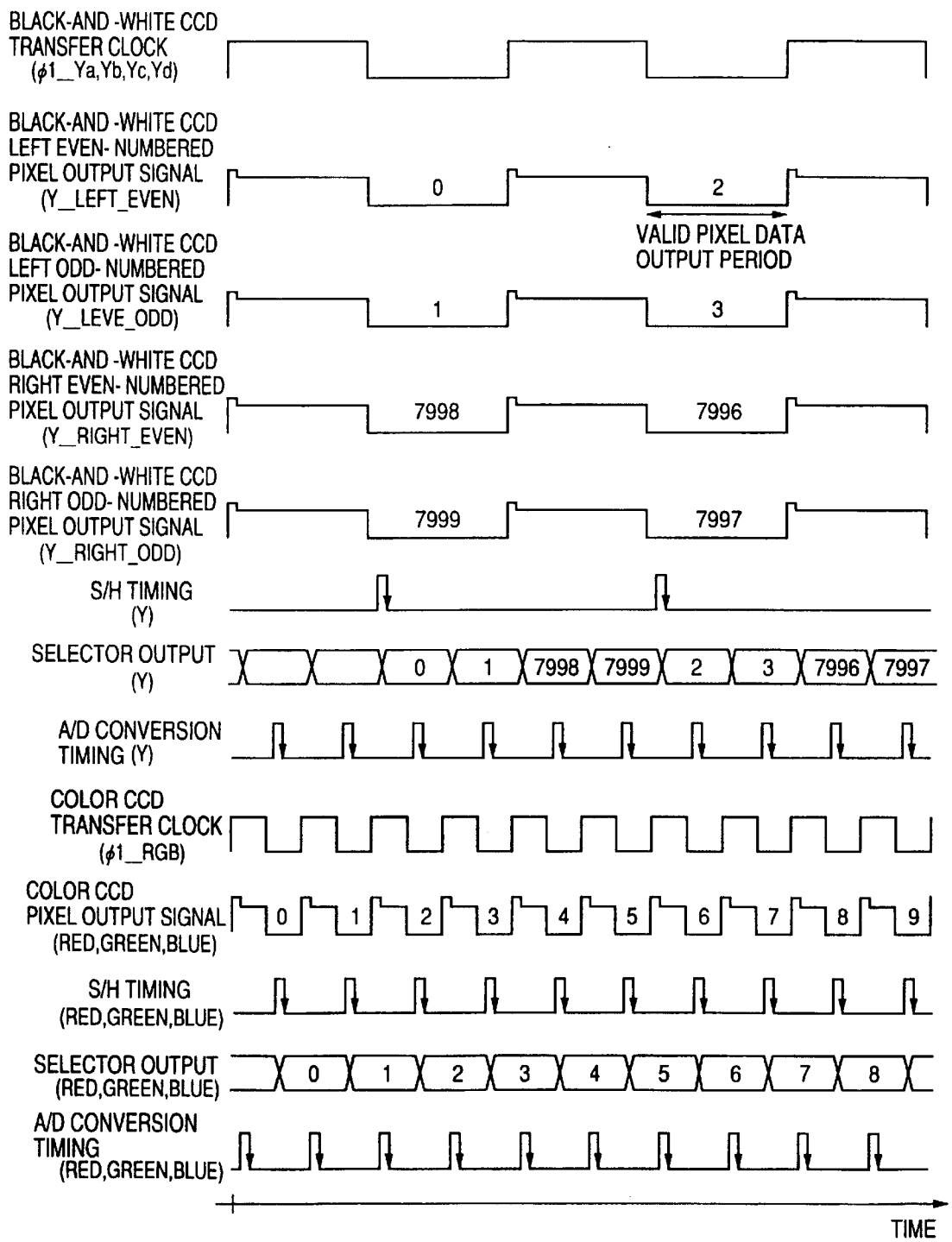
FIG. 5 is a timing chart showing other timings of processing in the low-speed color mode.
Figure 6:
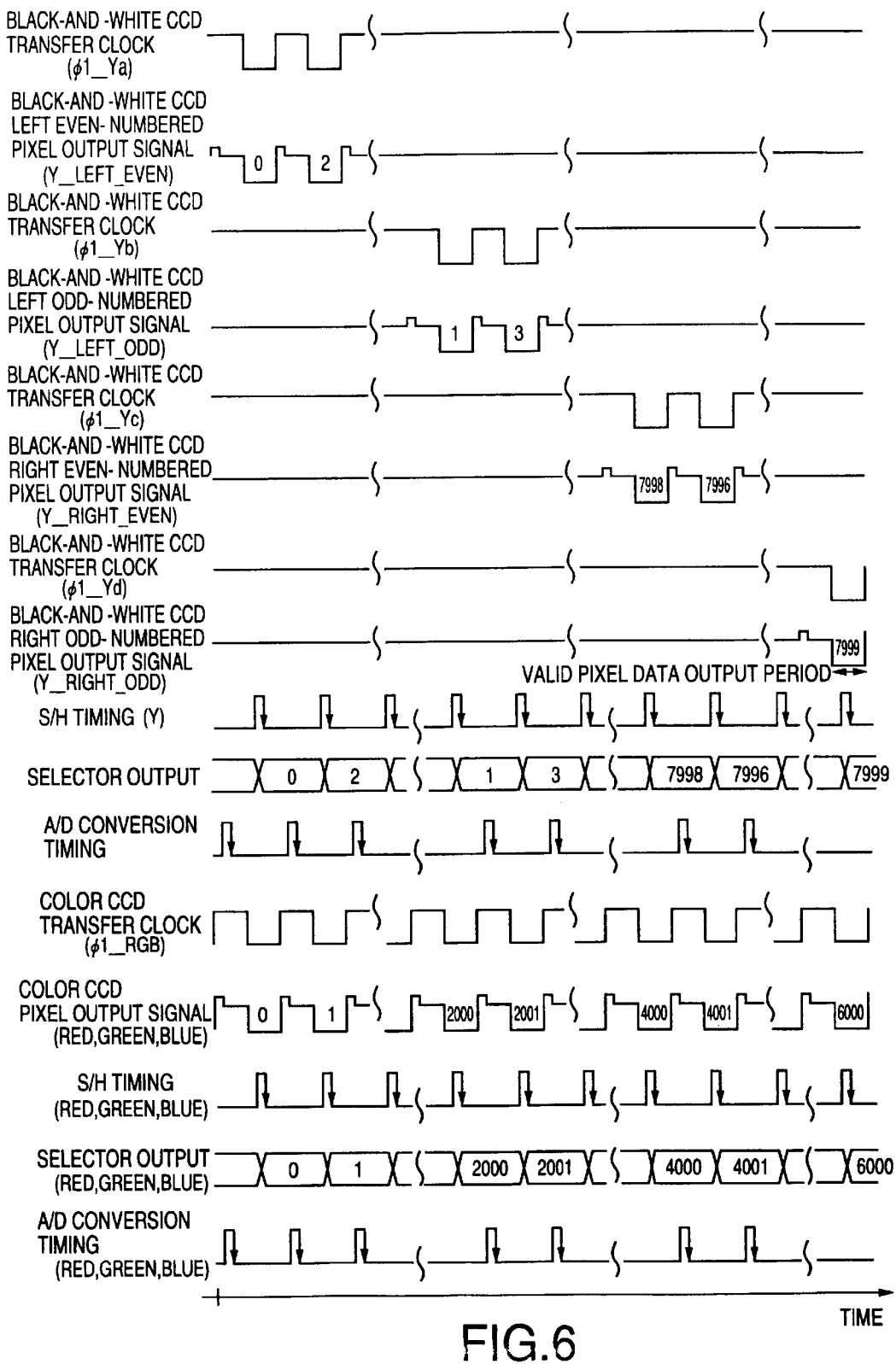
FIG. 6 is a timing chart showing still other timings of processing in the low-speed color mode.

In the low-speed color mode, the image reading rates of all of the Y sensor 20y, the R sensor 20r, the G sensor 20g, and the B sensor 20b are the same. As described above, the read signal from the Y sensor 20y is output after being divided into four signals, unlike the other color sensors 20r, 20g, and 20b. However, the signals must be processed at the same rate as the other color sensors 20r, 20g, and 20b. Hence, the transfer timings of the CCD analog shift registers 22ya, 22yb, 22yc, and 22yd are so adjusted that the signals are output at a ¼ rate. Three different control timings will be described below with reference to FIGS. 4, 5, and 6 showing the waveforms of the control signals.

Figure 4:
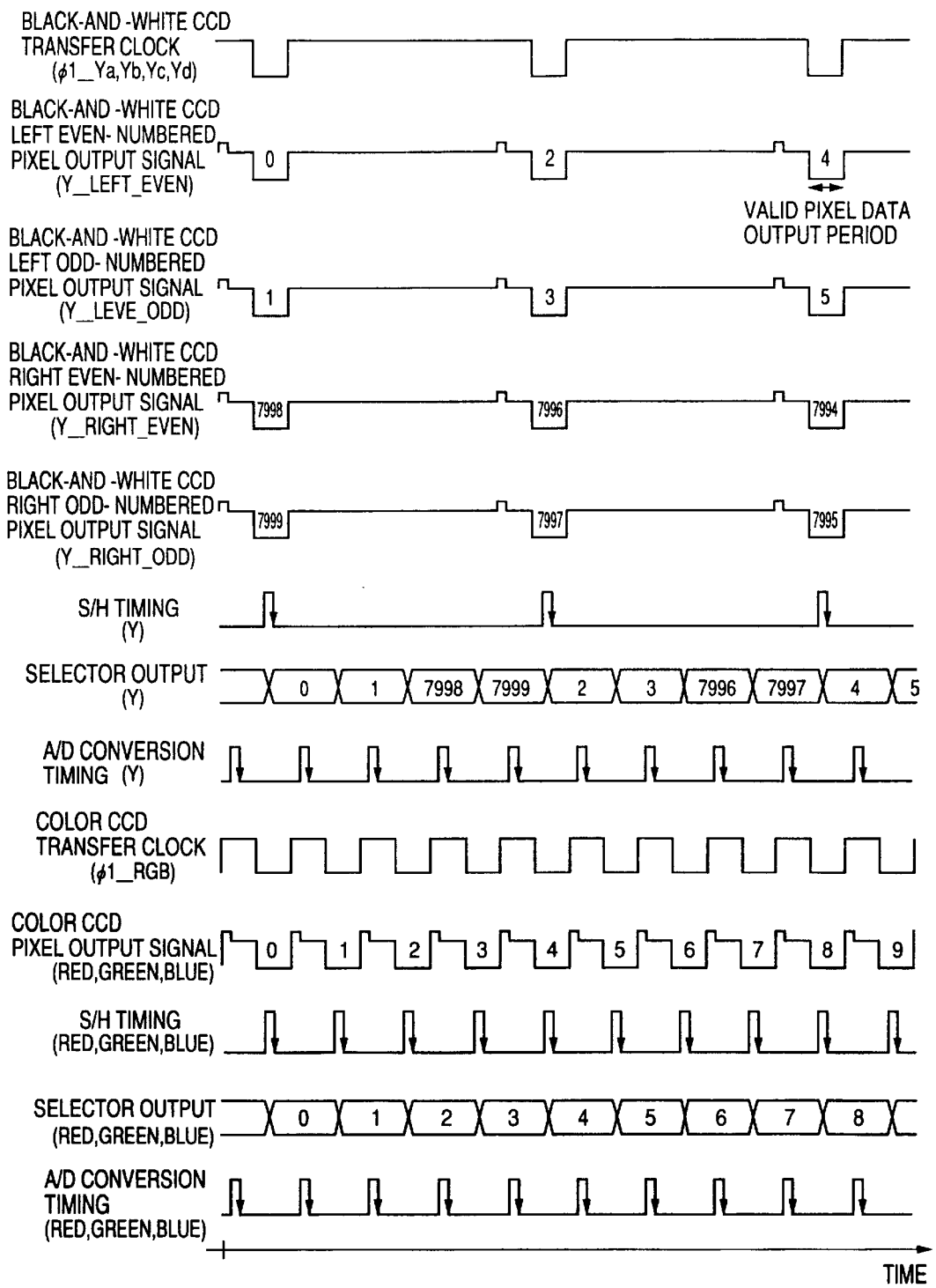
FIG. 4 is a timing chart showing the timings of processing in a low-speed color mode of the image reading apparatus.

At the control timing shown in FIG. 4, the period of the transfer clocks Φ1_Ya to Φ1_Yd and Φ2_Ya to Φ2_Yd of the CCD analog shift registers 22ya, 22yb, 22yc, and 22yd is set to be four times the transfer clocks Φ1_RGB and Φ2_RGB of the other color sensors 20r, 20g, and 20b, so that the transfer rate of the four divided outputs from the Y sensor 20y is the same as the other color sensors 20r, 20g, and 20b in this Y sensor 20y as a whole.

Also, the duty ratio of the transfer clocks is set such that the transfer clocks Φ1_Ya to Φ1_Yd and Φ2_Ya to Φ2_Yd of the Y sensor 20y and the transfer clocks Φ1_RGB and Φ2_RGB of the other color sensors 20r, 20g, and 20b have equal valid image data output periods (low-level periods in FIG. 4).

Output signals read out from the four CCD analog shift registers 22ya to 22yd of the Y sensor 20y in accordance with the transfer clocks Φ1_Ya to Φ1_Yd and Φ2_Ya to Φ2_Yd having the period and duty ratio as described above are held by the sample-and-hold circuits 6a to 6d. In addition, the selector 7a switches the outputs, and the common A/D converter 8a converts the output into a digital signal.

At this time, however, the order of pixels is changed in the image data read out as four divided signals and A/D-converted. Therefore, these pixels must be rearranged in the original order by the subsequent processing.

Meanwhile, the output signals from the color sensors 20r, 20g, and 20b are held by the sample-and-hold circuits 6e, 6f, and 6g, and supplied, via the selectors 7b, 7c, and 7d, to the A/D converters 8b, 8c, and 8d, respectively, where they are converted into digital signals.

Unlike the Y sensor 20y, the color sensors 20r, 20g, and 20b include only the CCD analog shift registers 22r, 22g, and 22b, respectively. Accordingly, the order of pixels is not changed in the image data after the A/D conversion, so these pixels need not be rearranged.

The waveforms of the transfer clocks Φ1_Ya to Φ1_Yd and Φ2_Ya to Φ2_Yd of the Y sensor 20y shown in FIG. 5 are formed by changing the duty ratio of the Φ1_Ya to Φ1_Yd and Φ2_Ya to Φ2_Yd shown in FIG. 4 to 50%. The other processing timings except for this duty ratio are the same as in FIG. 4, so a detailed description thereof will be omitted.

Unlike the transfer clocks Φ1_Ya to Φ1_Yd and Φ2_Ya to Φ2_Yd shown in FIGS. 4 and 5, the waveforms of the transfer clocks Φ1_Ya to Φ1_Yd and Φ2_Ya to Φ2_Yd of the Y sensor 20y shown in FIG. 6 have the same period as the other color sensors 20r, 20g, and 20b. However, data is continuously transferred collectively by each of the CCD analog shift registers 22ya, 22yb, 22yc, and 22yd. The selector 7a switches, for every ¼ line, the outputs from the CCD analog shift registers 22ya, 22yb, 22yc, and 22yd to select an image signal to be supplied to the A/D converter 8a.

Figure 7:
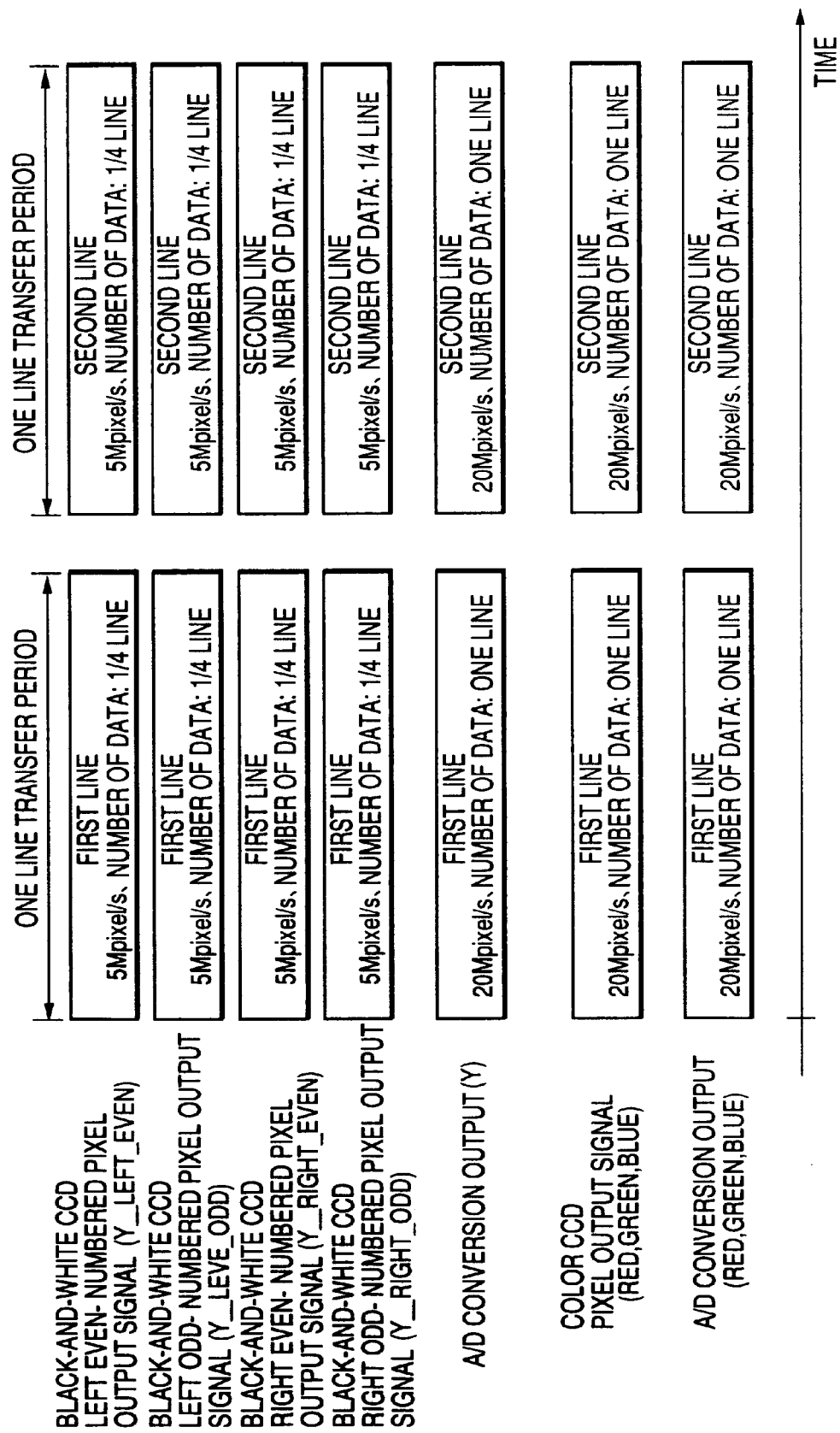
FIG. 7 is a view for explaining the timings of processing performed in units of lines when the processing timings shown in FIGS. 4 and 5 are used.

FIG. 7 shows the number of transfer data and the transfer data rate which each component (i.e., each of the CCD analog shift registers 22ya to 22yd for the Y sensor 20y, the A/D converter 8a, the CCD analog shift registers 22r, 22g, and 22b for the color sensors 20r, 20g, and 20b, and the A/D converters 8b to 8d) uses for each line, when the transfer clocks shown in FIG. 4 or 5 are used.

As shown in FIG. 7, the Y sensor 20y, the R sensor 20r, the G sensor 20g, and the B sensor 20b finally output digital image data equally at 20 Msps.

Figure 8:
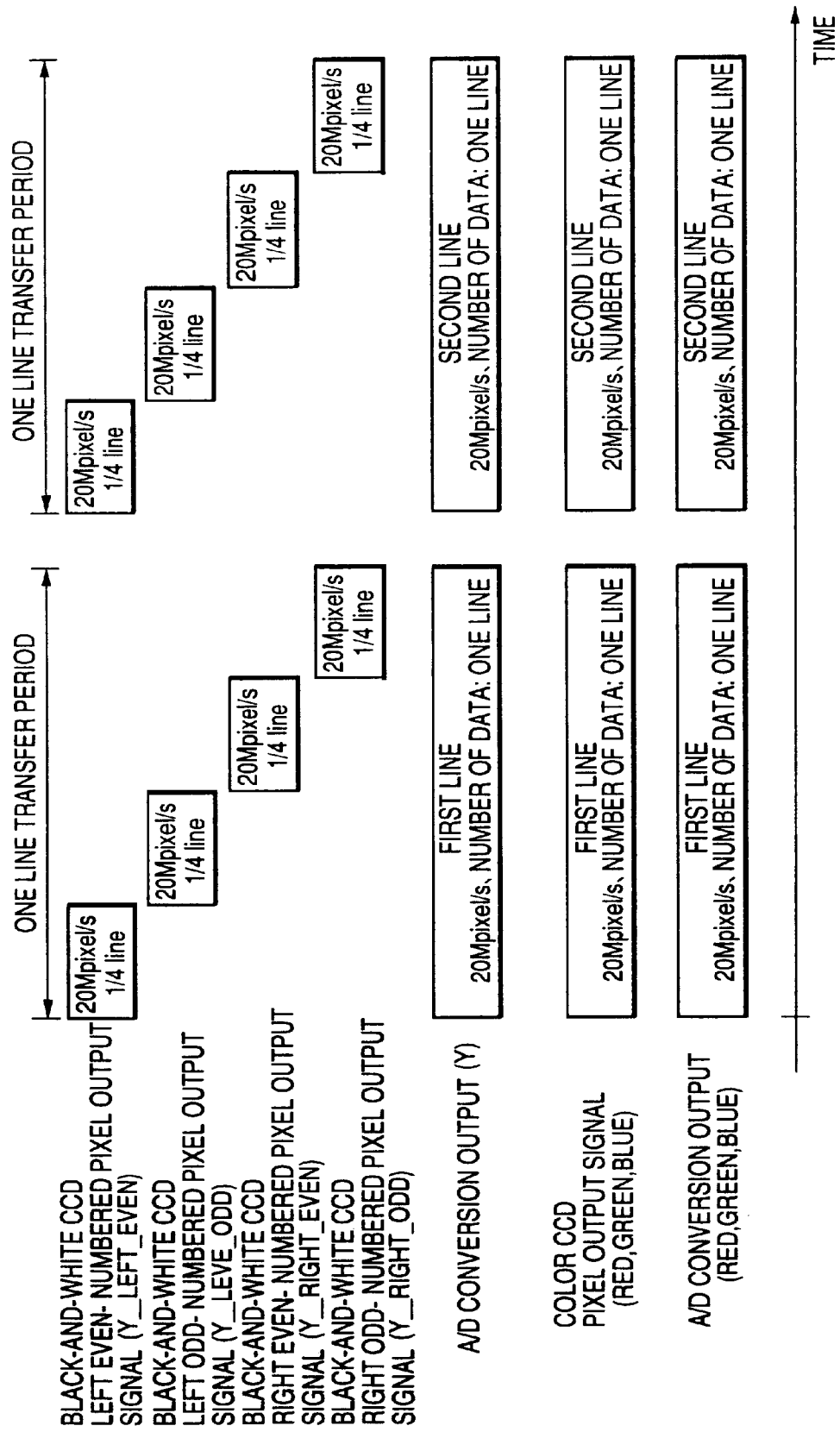
FIG. 8 is a view for explaining the timings of processing performed in units of lines when the processing timings shown in FIG. 6 are used.

FIG. 8 shows the number of transfer data and the transfer data rate which each component uses for each line when the transfer clocks shown in FIG. 6 are used.

As in the case shown in FIG. 7, FIG. 8 shows that the Y sensor 20y, the R sensor 20r, the G sensor 20g, and the B sensor 20b finally output digital image data equally at 20 Msps.

The operation timings of the high-speed monochromatic mode in which the image read rate of the Y sensor 20y is four times he image read rate of the R, G, and B sensors 20r, 20g, and 20b will be described below with reference to FIG. 9.

In the high-speed monochromatic mode, only the output signal from the Y sensor 20y is used, and none of the output signals from the other R, G, and B sensors 20r, 20g, and 20b is used. The four divided output signals from the Y sensor 20y are converted into digital signals by the four A/D converters 8a to 8d. Assuming the conversion rate of these A/D converters 8a to 8d is 20 Msps, 80-Msps monochromatic image data can be obtained as a whole.

Figure 9:
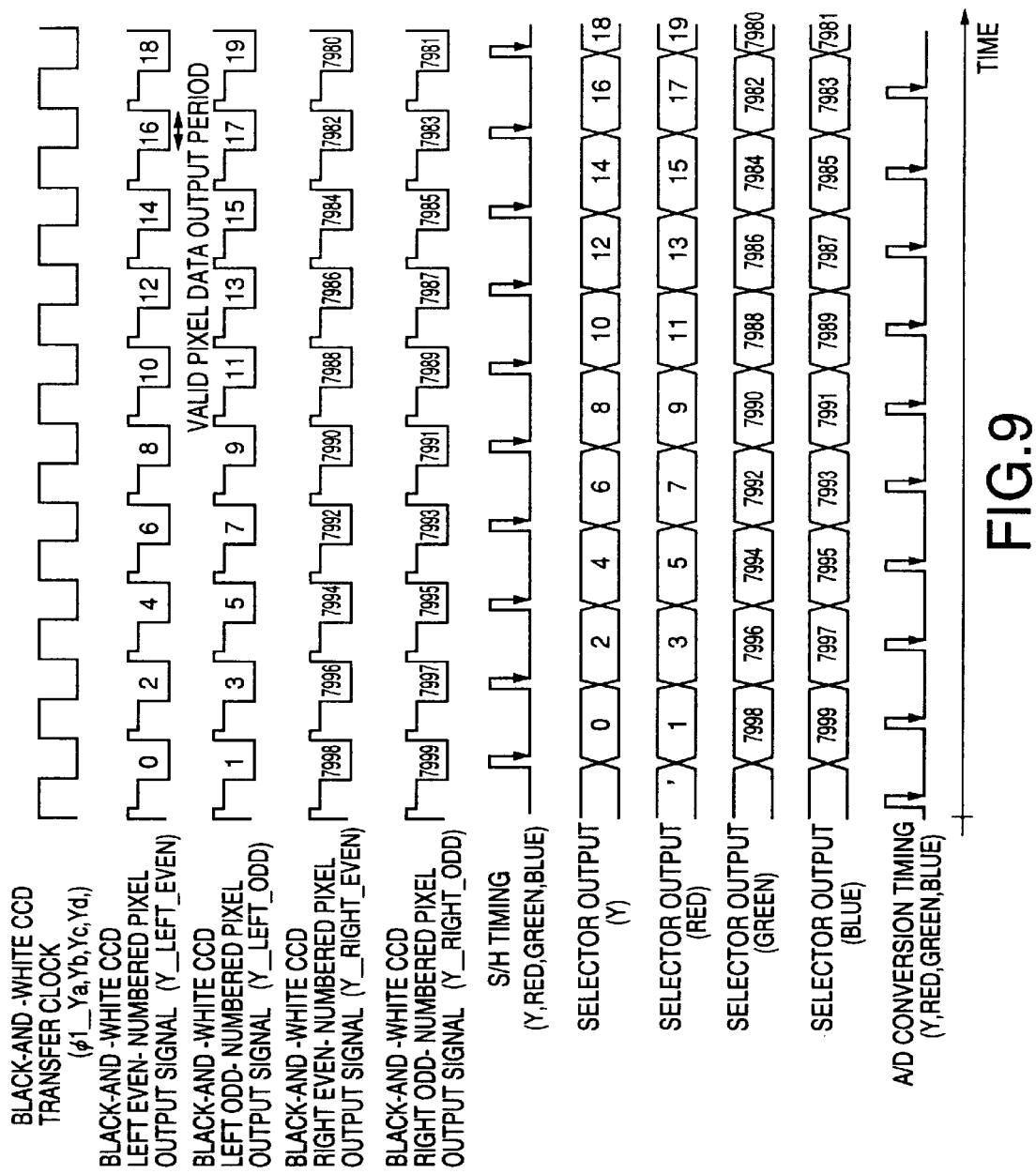
FIG. 9 is a view for explaining the timings of processing in a high-speed monochromatic mode.

As shown in FIG. 9, the four divided output signals from the Y sensor 20y, i.e., Y_LEFT EVEN (black-and-white, left even-numbered pixel), Y_LEFT_ODD (black-and-white, left odd-numbered pixel), Y_RIGHT_EVEN (black-and-white, right even-numbered pixel), and Y_RIGHT_ODD (black-and-white, right odd-numbered pixel) are held by the corresponding sample-and-hold circuits 6a, 6b, 6c, and 6d and distributed by the selectors 7a, 7b, 7c, and 7d to the A/D converters 8a, 8b, 8c, and 8d, respectively, where the signals are converted into digital signals.

At this time, however, in the image data read out as four divided signals and A/D-converted, pixels are arranged in the order by which they are output from the CCD analog shift registers 22ya, 22yb, 22yc, and 22yd. Therefore, these pixels must be rearranged in the original order by the subsequent processing.

Figure 10:
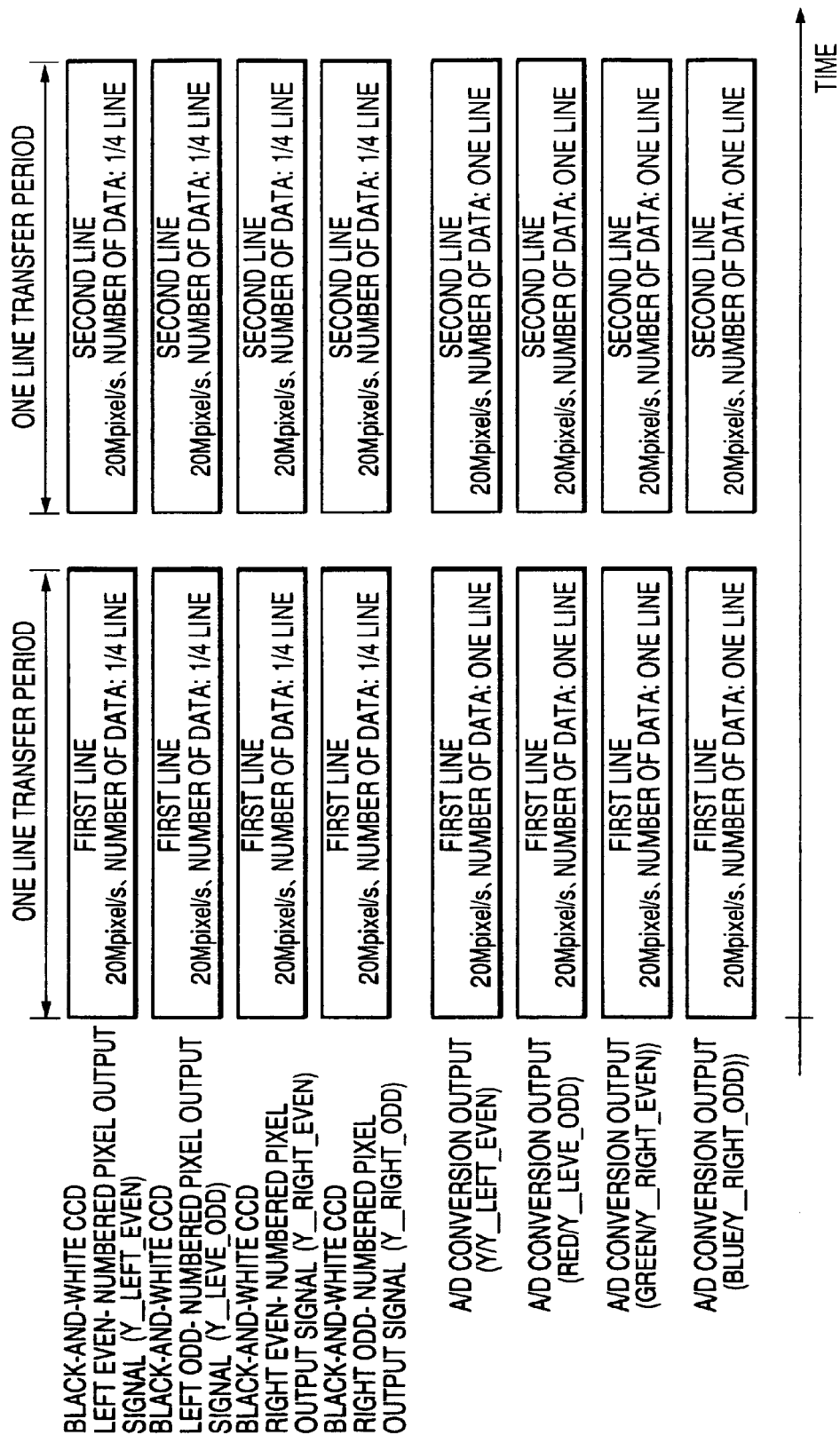
FIG. 10 is a view for explaining the timings of processing performed in units of lines when the processing timings shown in FIG. 9 are used.

FIG. 10 shows the number of transfer data and the transfer data rate which each component uses for each line when the processing timings shown in FIG. 9 are used.

Finally, each of the four divided Y image data Y_LEFT_EVEN, Y_LEFT_ODD, Y_RIGHT_EVEN, and Y_RIGHT_ODD is output as 20-Msps digital image data to generate 80-Msps monochromatic image data as a whole Y signal.

Details of the line delaying/rearranging units 11a, 11b, 11c, and 11d for delaying lines in the low-speed color mode and rearranging pixels in the high-speed monochromatic mode will be described below with reference to FIGS. 11 to 13.

Figure 11:
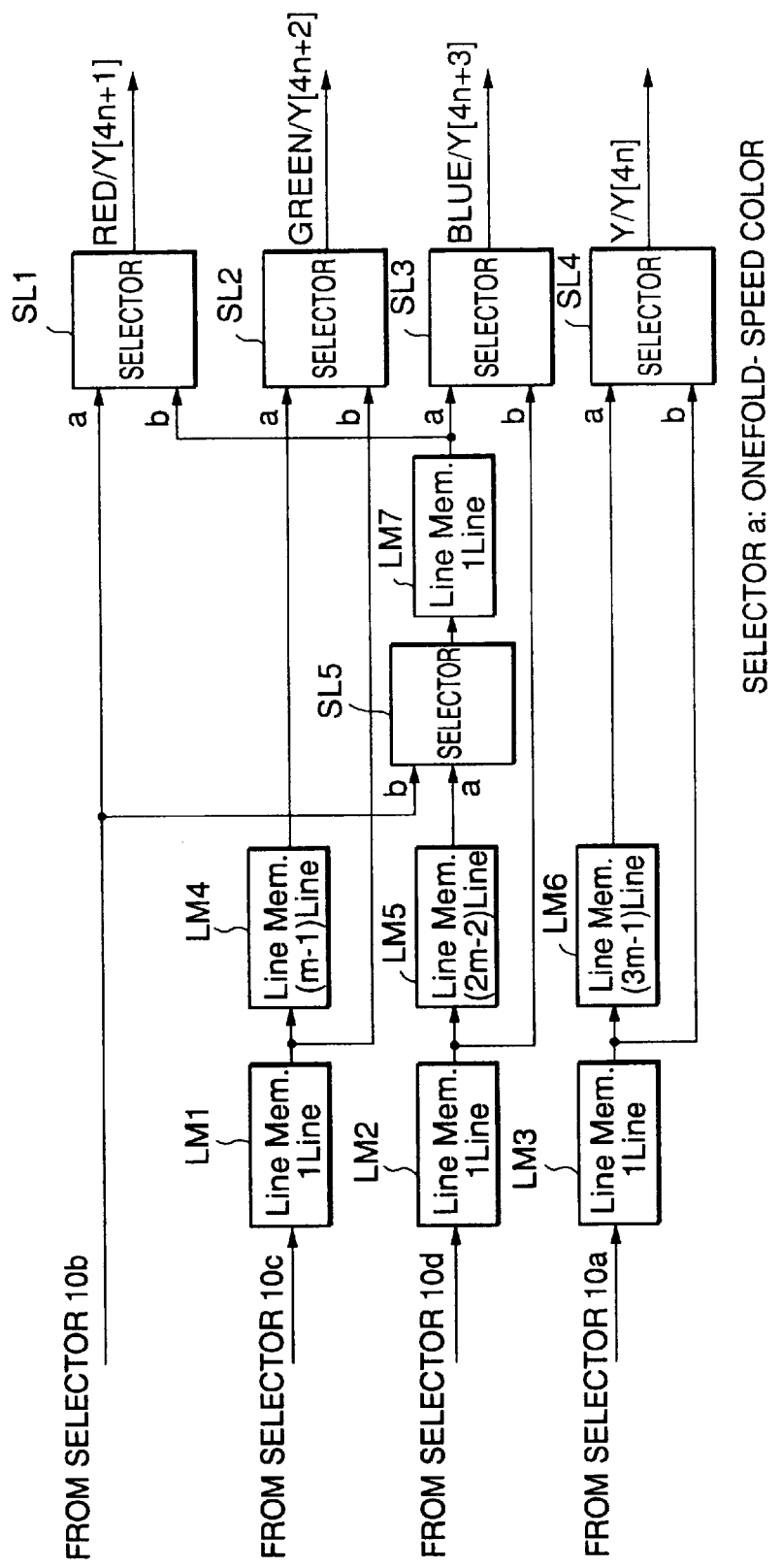
FIG. 11 is a block diagram showing the configuration of line delaying/rearranging units when a Y image is used in the low-speed color mode.

FIG. 11 shows the overall arrangement of the line delaying/rearranging units 11a, 11b, 11c, and 11d. These line delaying/rearranging units 11a, 11b, 11c, and 11d include line memories LM1 to LM3 and LM7 for delaying one line, a line memory LM4 for m−1 lines, a line memory LM5 for 2m−2 lines, a line memory LM6 for 3m−1 lines, and selectors SL1 to SL5. With this arrangement, the low-speed color mode and the high-speed monochromatic mode can be switched by the same configuration. The modes are switched by selecting an input a or b by each of the selectors SL1 to SL5.

Figure 12:
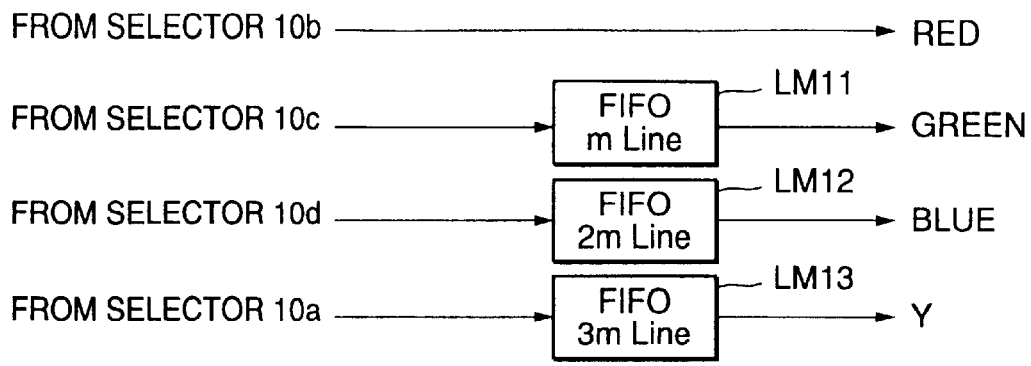
FIG. 12 is a block diagram showing the configuration of an equivalent circuit of the line delaying/rearranging units in the low-speed color mode.

An equivalent circuit in the low-speed color mode is as shown in FIG. 12. Assume, as shown in FIG. 2, that the sensors are arranged in the order of R, G, B, and Y and an original is read as indicated by the arrow. In this case, the last R sensor 20r is given a delay "0", the G sensor 20g is given a delay "m" equivalent to the distance between the sensors, the B sensor 20b is given a delay "2" equivalent to a twofold distance, and the Y sensor 20y is given a delay "3m" equivalent to a threefold distance.

These delays "0 to 3m" correspond to the magnifications set to finally obtain line information of the same original position when images read by these sensors are processed.

As described earlier, m=4 for onefold magnification, m=16 for 400% enlargement, and m=2 for 50% reduction. For magnification by which m is not an integer, m is set to be the closest integer. When this is the case, in the subsequent processing the processing accuracy is improved by interpolation from two, preceding and succeeding lines.

This configuration of the equivalent circuit in the low-speed color mode is realized by setting all of the selectors SL1 to SL5 to output the inputs a in the circuit shown in FIG. 11.

Figure 13:
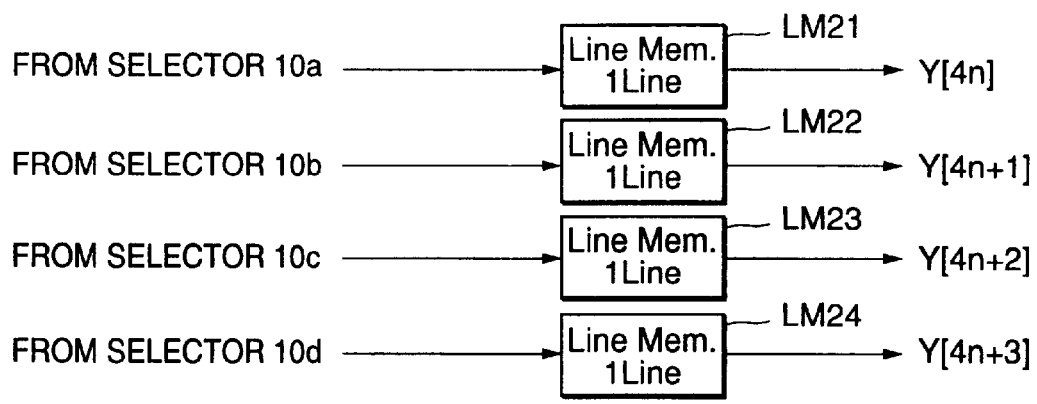
FIG. 13 is a block diagram showing the configuration of an equivalent circuit of the line delaying/rearranging units in the high-speed monochromatic mode.

An equivalent circuit in the high-speed monochromatic mode is as shown in FIG. 13. Since only the Y sensor 20y is used in this mode, the distance between the sensors is of no problem. Instead, the selectors 10a, 10b, 10c, and 10d must rearrange pixels in the original order in four divided Y image data. Therefore, outputs from these selectors 10a, 10b, 10c, and 10d are once written in line memories LM21 to LM24 and rearranged when read out. As line memories necessary for this processing, some line memories used in the low-speed color mode can be used. The minimum necessary capacity of a line memory required for rearrangement in the high-speed monochromatic mode is a ¼ line.

This configuration in the high-speed monochromatic mode is realized by allowing all of the selectors SL1 to SL5 to selectively output the inputs b.

Figure 14:
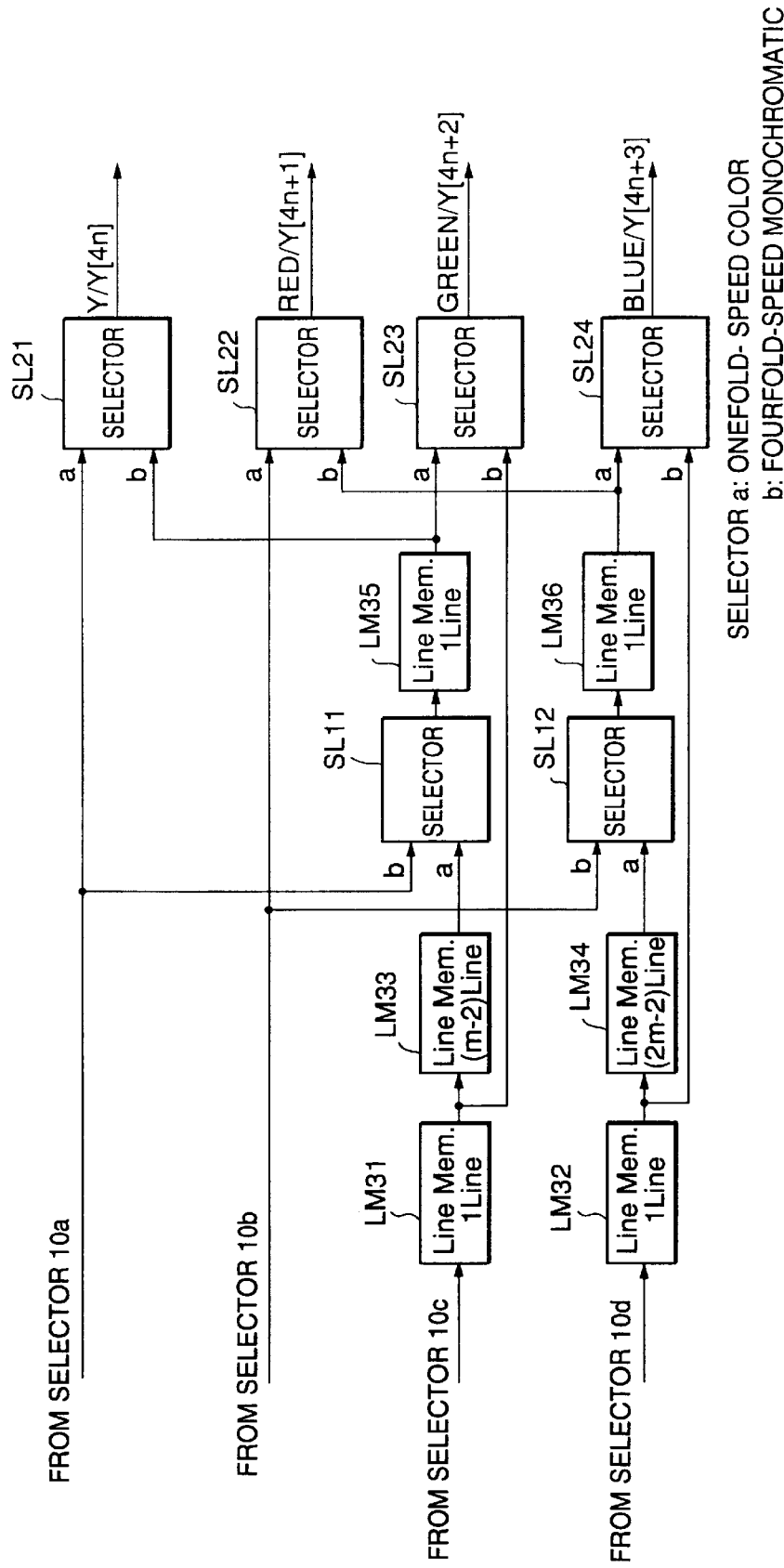
FIG. 14 is a block diagram showing the configuration of line delaying/rearranging units when no Y image is used in the low-speed color mode.

The circuit configuration shown in FIG. 11 is used when the Y sensor 20y is used in the low-speed color mode. In contrast, a circuit configuration shown in FIG. 14 is based on the assumption that no output from the Y sensor 20y is used in the low-speed color mode. This circuit includes one-line line memories LM31 to LM32, LM 35, and LM36, an (m−2)-line line memory LM33, a (2m−2)-line line memory LM34, and selectors SL11, SL12, and SL21 to SL24.

Figure 15:
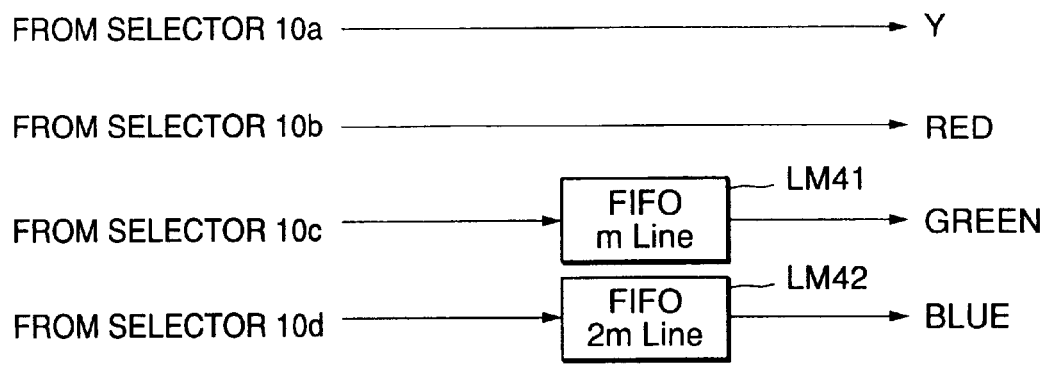
FIG. 15 is a block diagram showing the configuration of an equivalent circuit of the line delaying/rearranging units in the low-speed color mode.
Figure 16:
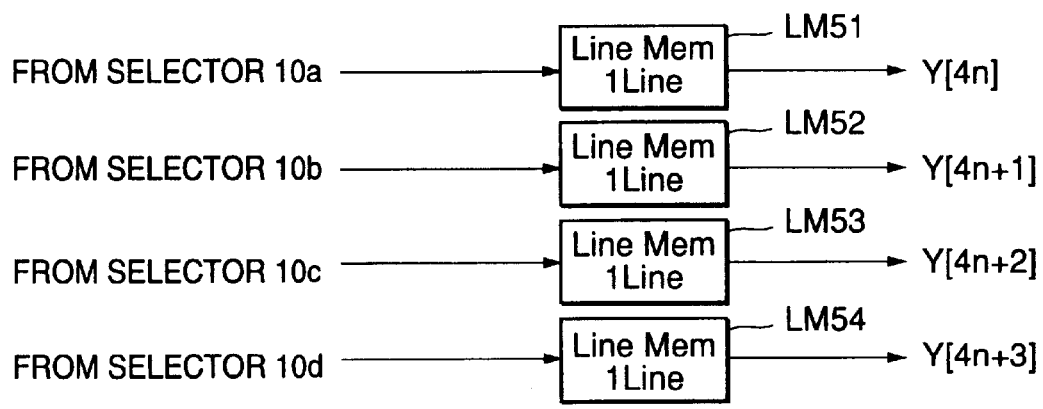
FIG. 16 is a block diagram showing the configuration of an equivalent circuit of the line delaying/rearranging units in the high-speed monochromatic mode.
Figure 17:
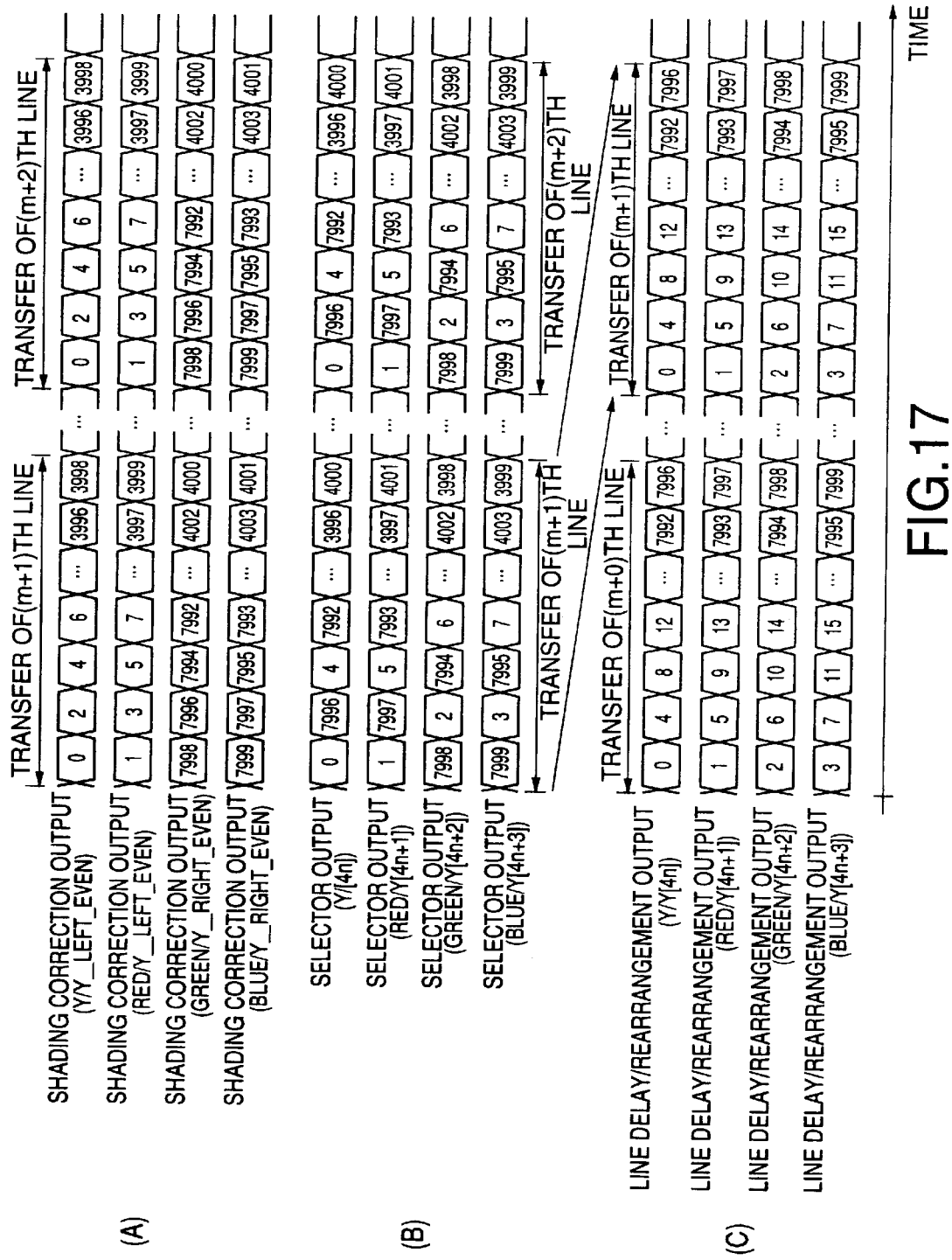
FIGS. 17A, 17B, and 17C are views for explaining a pixel rearranging process in the high-speed monochromatic mode.

This arrangement obviates the need for a delay memory for Y images in the low-speed color mode. Hence, in an equivalent circuit in the low-speed color mode as shown in FIG. 15, no line memory for delaying the output from the Y sensor 20y (the output from the selector 10a) is necessary, and no line memory for delaying the output from the last R sensor 20r (the output from the selector 10b) is necessary. That is, the circuit need only have an "m"-line line memory LM41 for delaying the output from the G sensor 20g (the selector 10c) and a "2m"-line line memory LM42 for delaying the output from the B sensor 10b (the selector 10d).

The configuration of this equivalent circuit is realized by allowing all of the selectors SL21 to SL24, SL11, and SL12 to selectively output the inputs a in the circuit shown in FIG. 4.

In the high-speed monochromatic mode, as in the circuit shown in FIG. 11, line memories LM51 to LM54 for delaying all of the four divided outputs from the Y sensor 20y by one line are necessary.

This configuration is implemented by permitting all of the selectors SL21 to SL24, SL11, and SL12 to selectively output the inputs b in the circuit shown in FIG. 14.

In the circuit shown in FIG. 14, no Y image need be used; a Y image can be generated from R, G, and B images in the subsequent processing circuits. However, owing to the positional accuracy, spectral sensitivity characteristic, and the like of each sensor, the image quality may become lower than that when a Y image output from the Y sensor 20y is used.

The process of rearranging pixels in the high-speed monochromatic mode will be described below with reference to FIGS. 17A to 17C.

As described above, pixels are rearranged by the processing combining the selectors 10a to 10d and the line delaying/rearranging units 11a to 11d.

In the high-speed monochromatic mode, as shown in FIG. 17A, the outputs from the shading correcting units 9a to 9d are in the order of the four divided outputs from the Y sensor 20y. That is, in outputs Y/Y_LEFT_EVEN, RED/Y_LEFT_ODD, GREEN/Y_RIGHT_EVEN, and BLUE/Y_RIGHT_ODD, the orders of pixels are 0, 2, 4, 6, . . . , 1, 3, 5, 7, . . . , 7998, 7996, 7994, 7992, . . . , and 7999, 7997, 7995, 7993, . . . , respectively.

These signals are supplied to the line memories of the line delaying/rearranging units 11a, 11b, 11c, and 11d by switching the outputs from the selectors 10a, 10b, 10c, and 10d, such that the pixel positions are Y[4n], Y[4n+1], Y[4n+2], and Y[4n+3] (n is an integer of 0 or larger).

Accordingly, as shown in FIG. 17B, pixel orders in selector outputs Y/[4n], RED/Y[4n+1], GREEN/Y[4n+2], and BLUE/Y[4n+3] are 0, 7996, 4, 7992, . . . , 1, 7997, 5, 7993, . . . , 7998, 2, 7994, 6, . . . , and 7999, 3, 7995, 7, . . . , respectively.

Furthermore, when image data of one line is written in each line memory, pixels are read out such that their positions are in the original order, thereby completing the rearrangement of the pixels. Consequently, as shown in FIG. 17C, the outputs from the line delaying/rearranging output units 11a (Y/Y[4n]), 11b (RED/Y[4n+1]), 11c (GREEN/Y[4n+2]), and 11d (BLUE/Y[4n+3]) are 0, 4, 8, 12, . . . , 1, 5, 9, 13, . . . , 2, 6, 10, 14, . . . , and 3, 7, 11, 15, . . . , respectively.

As a result, the outputs from the line delaying/rearranging output units 11a to 11d are in the order of 0, 1, 2, 3, 4, 5, 5 6, 7, . . . , i.e., the pixel positions are rearranged in the original order.

Figure 20:
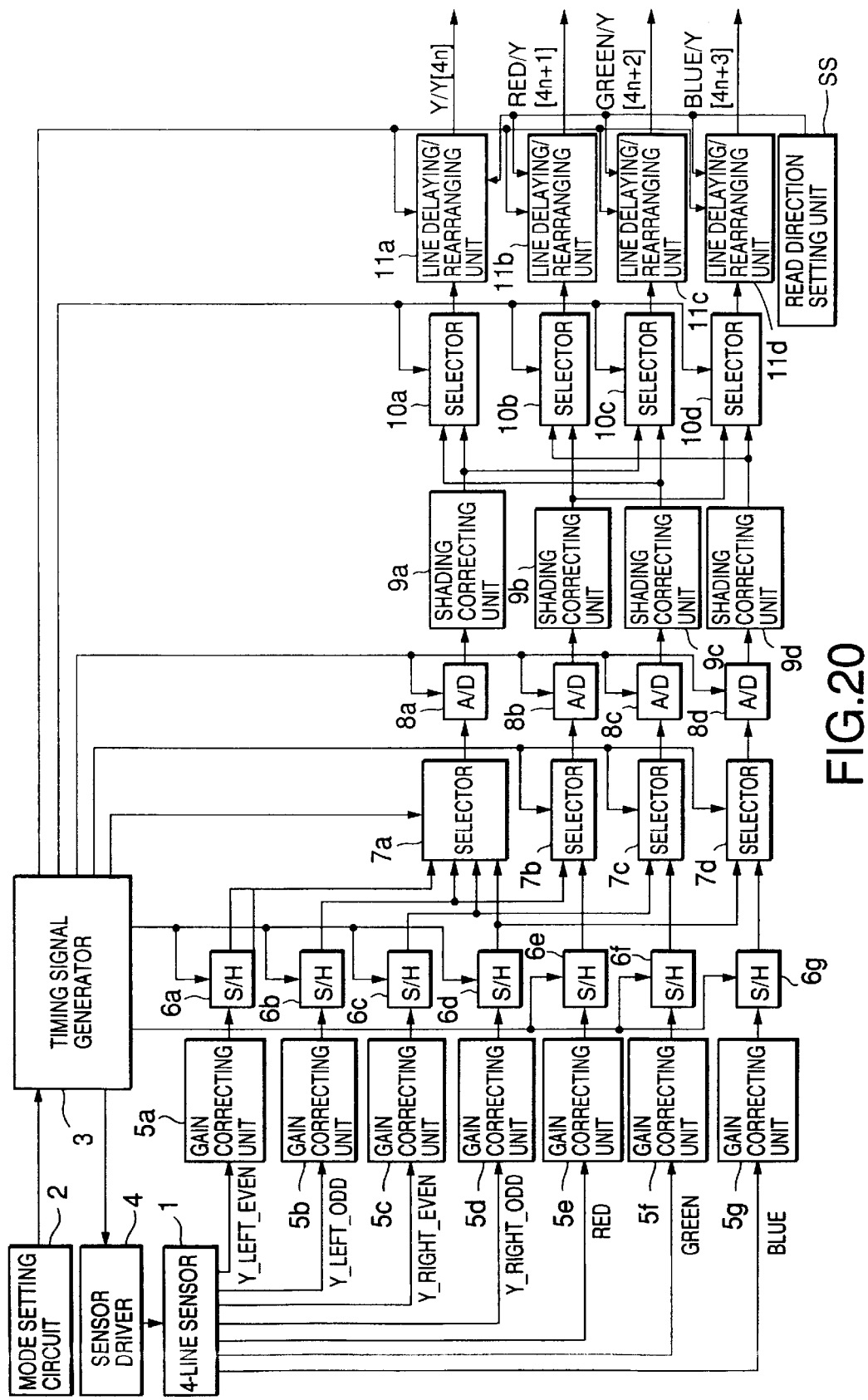
FIG. 20 is a block diagram showing a configuration capable of switching processing in forward scan and processing in backward scan.

A read direction setting unit SS shown in FIG. 20 can set one of forward scan in which the 4-line sensor 1 reads an original DC in the forward direction and backward scan in which the CCD sensor 1 reads the original DC in the reverse direction. In accordance with the set read direction, the line delaying/rearranging units 11a to 11d dynamically rearrange signals. This processing will be described below. The read direction setting unit SS can be installed in an operation panel which a common image reading apparatus has.

In this apparatus, the memory use amount can be minimized by dynamically switching line delay for the outputs from the color sensors 20r, 20g, and 20b in the low-speed color mode and pixel rearrangement for the output from the Y sensor 20y in the high-speed monochromatic mode.

Also, by combining this apparatus with an automatic document feeder, originals sequentially fed by the document feeder can be read both ways, i.e., both forward and backward. This makes high-speed continuous original reading possible, unlike in an image reading apparatus capable of only forward image reading which requires carriage return of the 4-line sensor 1.

Figure 18:
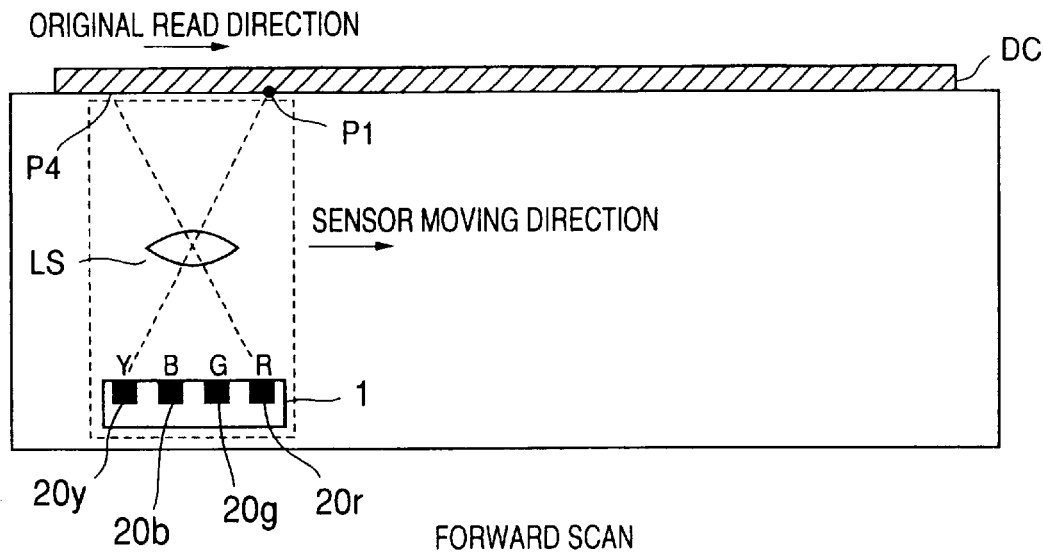
FIG. 18 is a view for explaining an original read operation during forward scan.

FIG. 18 schematically shows a forward-scan original read operation of reading an original in the forward direction indicated by a rightward arrow.

The original DC is placed on an original table, and the 4-line sensor 1 and a lens LC move to the right as indicated by the arrow in FIG. 18 to read this original DC line by line.

As described previously, in the 4-line sensor 1 the color line sensors 20y, 20r, 20g, and 20b are arranged at equal intervals. Therefore, these sensors 20y, 20r, 20g, and 20b read different lines on the original DC in accordance with the read density and moving speed in the moving direction of the 4-line sensor 1. Assume that the difference between lines on the original DC read by the sensors 20y, 20r, 20g, and 20b is m lines.

When this is the case, in the low-speed color mode the timings of the outputs, shifted m lines from each other, from the line sensors 20y, 20r, 20g, and 20b must be so adjusted that the outputs of all colors are the results of reading of the same line on the original DC.

In the example shown in FIG. 18, in forward scan a read position P1 of the Y sensor 20y comes before a read position P4 of the R sensor 20r owing to the action of the lens LS. Accordingly, the original DC is read in the order of the Y sensor 20y, the B sensor 20b, the G sensor 20g, and the R sensor 20r.

Also, in the high-speed monochromatic mode, the output from the Y sensor 20y is divided into four outputs in accordance with odd-numbered pixels, even-numbered pixels, right-hand side, and left-hand side. Hence, to arrange pixels in the regular order, rearrangement by a line memory of one line is necessary.

Figure 19:
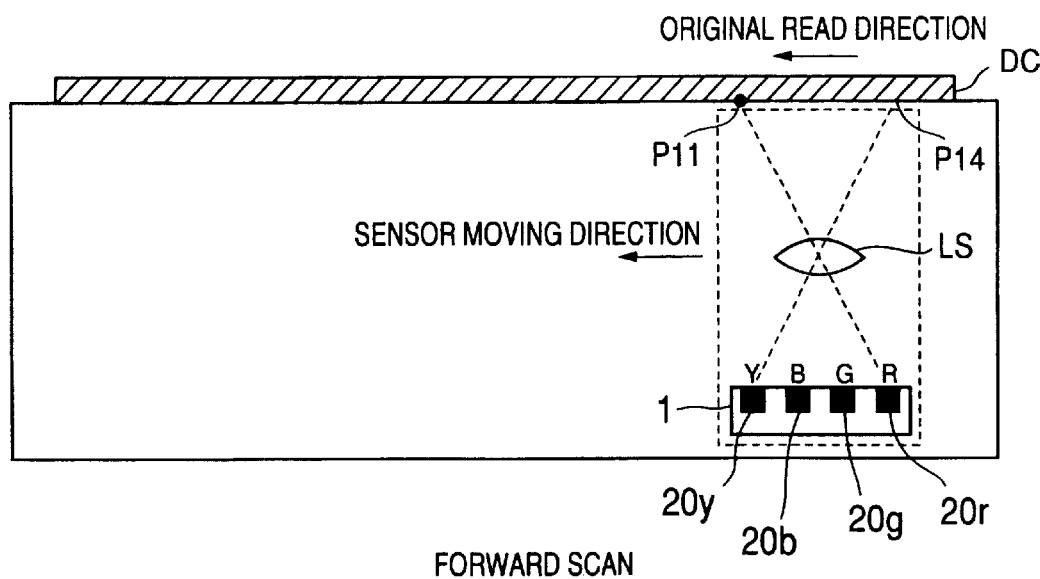
FIG. 19 is a view for explaining an original read operation during backward scan.

FIG. 19 schematically shows a backward-scan operation.

The original DC placed on the original table is read line by line by moving the 4-line sensor 1 and the lens LS to the left in FIG. 19. In the 4-line sensor 1, the color line sensors 20y, 20r, 20g, and 20b are arranged at equal intervals. As described above, these sensors 20y, 20r, 20g, and 20b read different lines on the original DC in accordance with the read density and moving speed in the moving direction of the sensor 1.

As in the forward scan described above, assume that the difference between lines on the original DC read by the sensors 20y, 20r, 20g, and 20b is m lines. In this case, in the low-speed color mode the timings of the outputs, shifted m lines from each other, from the line sensors 20y, 20r, 20g, and 20b must be so adjusted that the outputs of all colors are the results of reading of the same line on the original DC.

In the high-speed monochromatic mode, signals divisionally output from the Y sensor 20y in accordance with odd-numbered pixels, even-numbered pixels, right-hand side, and left-hand side must be rearranged such that pixels are arranged in the regular order.

In backward scan, a read position P11 of the R sensor 20r comes before a read position P14 of the Y sensor 20y. Therefore, the original DC is read in the order of the R sensor 20r, the G sensor 20g, the B sensor 20b, and the Y sensor 20y.

The process of correcting the differences between the original read lines of the sensors 20y, 20b, 20g, and 20r of the 4-line sensor 1 in the low-speed color mode and the arrangement of line memories used to rearrange pixels in the Y sensor 20y in the high-speed monochromatic mode will be described next.

The line delaying/rearranging units 11a to 11d can control both onefold-speed color forward scan and backward scan, and fourfold-speed monochromatic forward scan and backward scan. The line memory capacity of these line delaying/rearranging units 11a to 11d is a capacity necessary for onefold-speed color backward scan which requires the largest capacity for line correction. Other modes can be controlled by switching the memory configurations of line memories in accordance with the mode, without adding any new memory.

Figure 22:
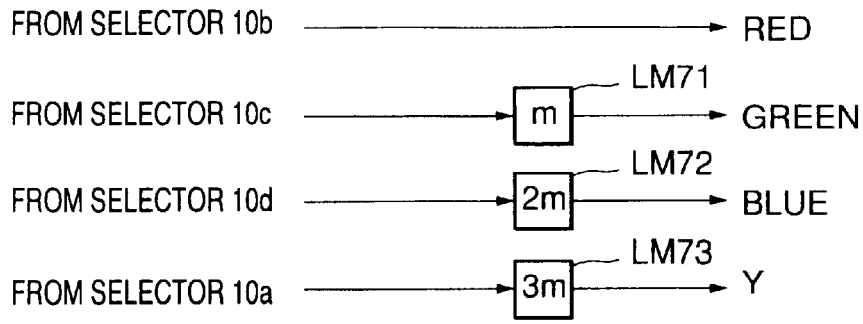
FIG. 22 is a block diagram showing the configuration of an equivalent circuit, when onefold-speed color forward scan is performed, of the line memories shown in FIG. 20.

FIG. 22 shows the arrangement of line memories in onefold-speed color forward scan. Assume that a read difference of m lines is present between the line sensors 20y, 20b, 20g, and 20r as shown in FIG. 18, and that the Y sensor 20y leads the R sensor 20r by 3m lines in reading the original DC.

In this case, to correct the difference of the output from the Y sensor 20y from the output from the R sensor 20r, the read image must be delayed 3m lines by a line memory LM73. Also, it is necessary to delay the output from the B sensor 20b by 2m lines by a line memory LM72 and the output from the G sensor 20g by 1m lines by a line memory LM71.

In the high-speed monochromatic mode, the output from the Y sensor 20y is divided in accordance with odd-numbered pixels, even-numbered pixels, right-hand side, and left-hand side. Therefore, to arrange pixels in the regular order, rearrangement by a line memory of one line is necessary. This rearrangement can be performed by one line during the 3m-line delaying process. Hence, a line memory for rearranging pixels in this case can be included in the 3m-line delay memory LM73.

Figure 23:
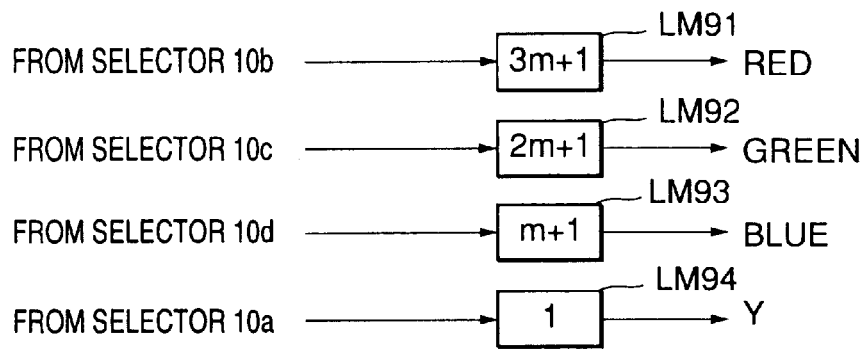
FIG. 23 is a block diagram showing the configuration of an equivalent circuit, when onefold-speed color backward scan is performed, of the line memories shown in FIG. 20.

FIG. 23 shows the arrangement of line memories in onefold-speed color backward scan. A read difference of m lines is present between the line sensors 20y, 20b, 20g, and 20r, and the R sensor 20r leads the Y sensor 20y by 3m lines in reading an original.

In this case, to correct the difference of the output from the R sensor 20r from the Y sensor 20y, the read image must be delayed 3m lines. Also, it is necessary to delay the output from the G sensor 20g by 2m lines and the output from the B sensor 20b by m lines.

The output from the Y sensor 20y is divided in accordance with odd-numbered pixels, even-numbered pixels, right-hand side, and left-hand side. Therefore, to arrange pixels in the regular order, rearrangement by a line memory of one line is necessary. Hence, to match the image of the Y sensor 20y after the pixel rearrangement with the timings of the outputs from the other color line sensors 20b, 20g, and 20r, one-line delay memory (m) for the Y sensor 20y is necessary in addition to delay memories (m, 2m, and 3m) for line correction for the outputs from these color line sensors.

Accordingly, it is necessary to use a line memory LM91 for delaying the output from the R sensor 20r, which is the image reading leader, by 3m+1 lines, a line memory LM92 for delaying the output from the G sensor 20g by 2m+1 lines, a line memory LM93 for delaying the output from the B sensor 20b by m+1 lines, and a line memory LM94 for delaying the output from the Y sensor 20y by one line.

Figure 24:
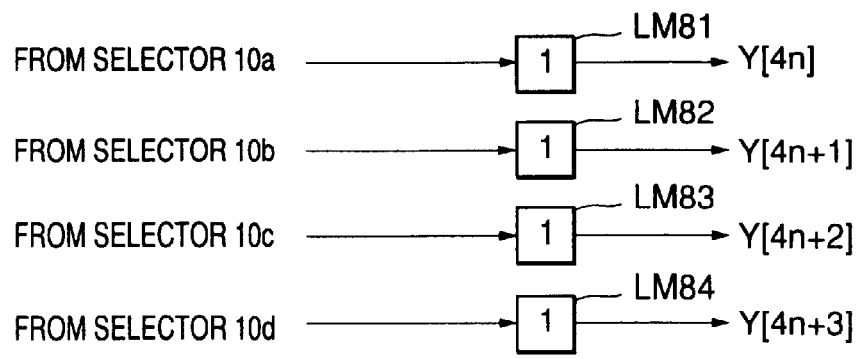
FIG. 24 is a block diagram showing the configuration of an equivalent circuit, when fourfold-speed monochromatic forward scan or backward scan is performed, of the line memories shown in FIG. 20.

FIG. 24 shows the arrangement of line correction memories for forward scan and backward scan in the fourfold-speed monochromatic mode.

In this fourfold-speed monochromatic mode, only the Y sensor 20y is used, so it is unnecessary to correct lines between the color line sensors 20r, 20g, and 20b. However, the output from the Y sensor 20y is divided in accordance with odd-numbered pixels, even-numbered pixels, right-hand side, and left-hand side. Hence, to arrange pixels in the regular order, rearrangement by one-line line memories LM81 to LM84 is necessary.

To this end, ½-line line memories for rearranging pixels are necessary for the four outputs from the Y sensor 20y. However, the four divided output data are equivalent to ¼-line data of the Y sensor 20y as a whole, so the capacity of a ½ line is necessary to use as a double buffer. In this example, the line memories LM81 to LM84 having the capacity of one line are required to switch the onefold-speed color mode and the fourfold-speed monochromatic mode.

Figure 21:
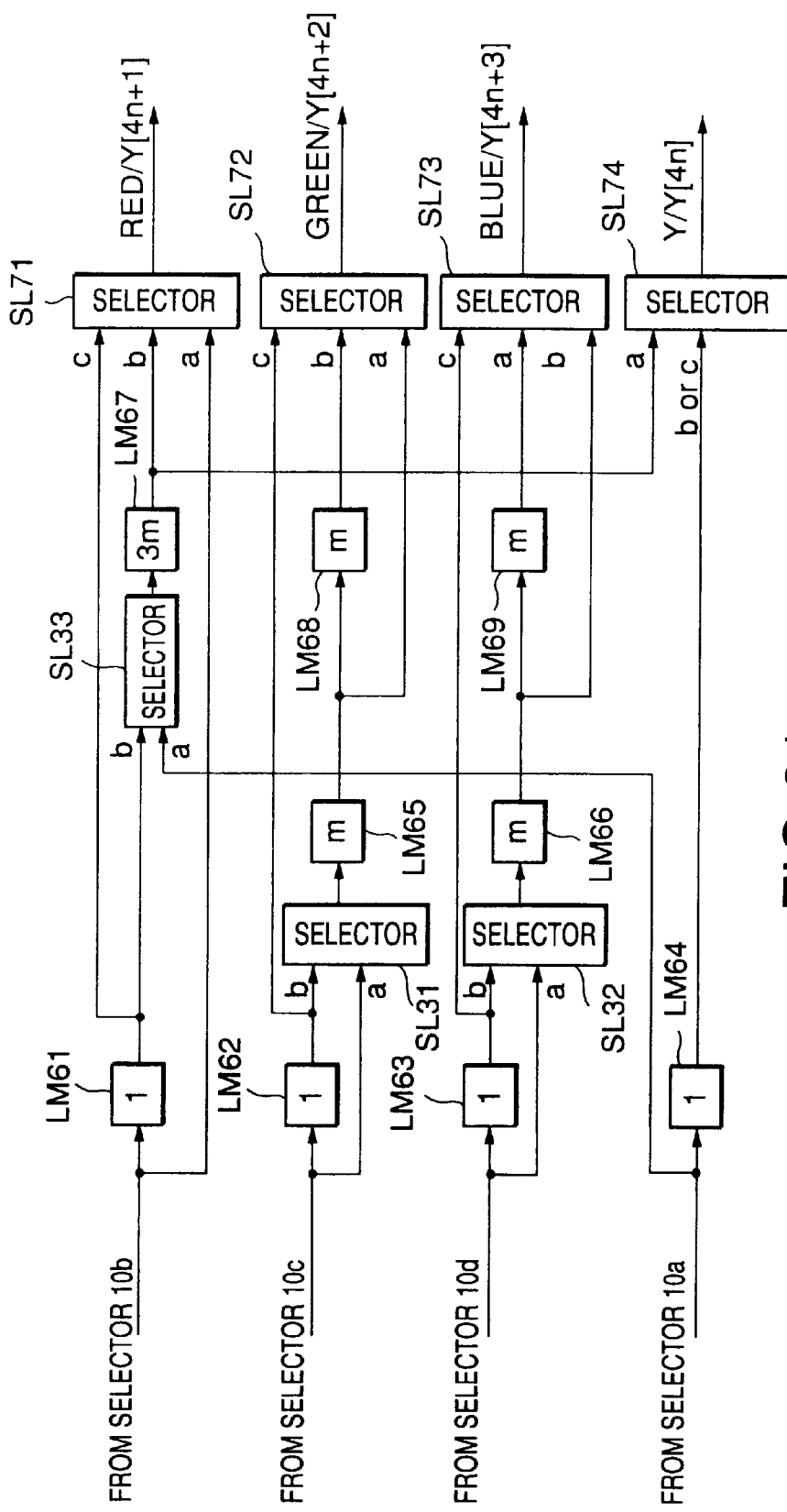
FIG. 21 is a block diagram showing the arrangement of line memories in line delaying/rearranging units shown in FIG. 20.

FIG. 21 shows the configuration of a line correction memory capable of performing all of onefold-speed color forward scan, onefold-speed color backward scan, fourfold-speed monochromatic forward scan, and fourfold-speed monochromatic backward scan. This line correction memory includes 1-one line memories LM61 to LM64, m-line line memories LM65, LM66, LM68, and LM69, a 3m-line line memory LM67, and selectors SL31 to SL33 and SL71 to SL74.

The selectors SL31 to SL33 switch inputs a and b, and the selectors SL71 to SL74 switch inputs a, b, and c. In one fold-speed color forward scan, the inputs a are selected to realize a circuit configuration equivalent to the circuit shown in FIG. 22. In onefold-speed color backward scan, the inputs b are selected to realize a circuit equivalent to the circuit shown in FIG. 23. In fourfold-speed monochromatic forward scan and backward scan, a circuit configuration equivalent to the circuit shown in FIG. 24 is obtained by choosing the inputs c.

With this arrangement of the line memories, the memory capacity can be made smaller than the necessary capacity of onefold-speed color backward scan which requires the largest capacity for line correction. This can minimize the entire capacity. The individual modes can be readily controlled by switching the connections of the delay memories by using the selectors SL31 to SL33 and SL71 to SL74.

The above embodiment is merely an example and hence does not restrict the present invention. For example, the circuit configurations shown in FIGS. 1, 11, and 14 are examples, so they can be variously modified without departing from the scope of the invention.

What is claimed is:

1. An image reading apparatus comprising:
    a line sensor unit including a monochromatic sensor for outputting a one-line signal by dividing the signal into a plurality of signals, and a plurality of color sensors;
    a mode setting circuit for setting one of a monochromatic mode and a color mode;
    a monochromatic analog-to-digital converter which corresponds to said monochromatic sensor and receives signals and performs analog-to-digital conversion for the received signals;
    a plurality of color analog-to-digital converters which correspond to said plurality of color sensors and receive signals and perform analog-to-digital conversion for the received signals; and
    a selector for distributing, when the monochromatic mode is set in said mode setting circuit, the plurality of output signals from said monochromatic sensor to said monochromatic analog-to-digital converter and said color analog-to-digital converters to cause said monochromatic and color analog-to-digital converters to perform analog-to-digital conversion for the signals.

2. An apparatus according to claim 1, wherein when the color mode is set in said mode setting circuit, said selector supplies output signals from said color sensors to corresponding ones of said color analog-to-digital converters to cause said color analog-to-digital converters to perform analog-to-digital conversion for the signals.

3. An apparatus according to claim 2, wherein when the color mode is set in said mode setting circuit, said line delaying/rearranging units receive the digital signals, which are output from said color sensors and subjected to analog-to-digital conversion by said color analog-to-digital converters, and output the digital signals by rearranging the signals.

4. An apparatus according to claim 1, further comprising line delaying/rearranging units which correspond to said monochromatic analog-to-digital converter and said color analog-to-digital converters, and receive output digital signals, delay the signals in units of lines, and output the digital signals by rearranging the signals,
    wherein when the monochromatic mode is set in said mode setting circuit, said line delaying/rearranging units receive the digital signals, which are divisionally output from said monochromatic sensor and subjected to analog-to-digital conversion by said monochromatic analog-to-digital converter and said color analog-to-digital converters, and output the digital signals by rearranging the signals.

5. An apparatus according to claim 4, further comprising a read direction setting unit for setting an original read direction to one of a forward direction and a reverse direction,
    wherein in accordance with one of the forward direction and the reverse direction set in said read direction setting unit, said line delaying/rearranging units switch a line delaying and pixel rearranging process in the forward direction and a line delaying and pixel rearranging process in the reverse direction.

6. An apparatus according to claim 1, wherein the number of divided outputs from said monochromatic sensor is larger than the number of divided outputs from said color sensors.

7. An apparatus according to claim 6, wherein said monochromatic sensor divides the signal by a number four times the number of said color sensors and outputs the divided signals.

8. An apparatus according to claim 1, wherein said monochromatic sensor is placed closer to one end face of said sensor unit than said color sensors.

9. An apparatus according to claim 1, wherein said sensor unit is set such that when an original is read in a forward direction, said monochromatic sensor reads a position on the original, which leads positions read by said color sensors.

10. An image reading method of performing image processing by using a line sensor unit including a monochromatic sensor for outputting a one-line signal by dividing the signal into a plurality of signals, and a plurality of color sensors, a monochromatic analog-to-digital converter which corresponds to said monochromatic sensor and receives signals and performs analog-to-digital conversion for the received signals, and a plurality of color analog-to-digital converters which correspond to said plurality of color sensors and receive signals and perform analog-to-digital conversion for the received signals,
    wherein when a monochromatic mode rather than a color mode is set, the plurality of output signals from said monochromatic sensor are distributed to said monochromatic analog-to-digital converter and said color analog-to-digital converters to cause said monochromatic and color analog-to-digital converters to perform analog-to-digital conversion for the signals.

11. A method according to claim 10, wherein when the color mode is set, output signals from said color sensors are supplied to corresponding ones of said color analog-to-digital converters to cause said color analog-to-digital converters to perform analog-to-digital conversion for the signals.

12. A method according to claim 10, wherein line delaying/rearranging units corresponding to said monochromatic analog-to-digital converter and said color analog-to-digital converters are used to receive output digital signals, delay the signals in units of lines, and output the digital signals by rearranging the signals, and when the monochromatic mode is set, only the divided output signals from said monochromatic sensor are used to rearrange digital signals subjected to analog-to-digital conversion by said monochromatic analog-to-digital converter and said color analog-to-digital converters.

13. A method according to claim 10, wherein when the color mode is set, the digital signals, which are output from said color sensors and subjected to analog-to-digital conversion by said color analog-to-digital converters, are rearranged by using said line delaying/rearranging units.

14. A method according to claim 10, wherein when an original read direction is set to one of a forward direction and a reverse direction, in accordance with one of the forward direction and the reverse direction set as the read direction, said line delaying/rearranging units switch a line delaying and pixel rearranging process in the forward direction and a line delaying and pixel rearranging process in the reverse direction.

* * * * *